United States Patent [19]
Liou et al.

[11] Patent Number: 5,835,163
[45] Date of Patent: Nov. 10, 1998

[54] APPARATUS FOR DETECTING A CUT IN A VIDEO

[75] Inventors: Shih-Ping Liou, Robbinsville, N.J.; David L. Loghing, Huntingdon Valley, Pa.; Farshid Arman, Hamilton, N.J.

[73] Assignee: Siemens Corporate Research, Inc., Princeton, N.J.

[21] Appl. No.: 576,272

[22] Filed: Dec. 21, 1995

[51] Int. Cl.⁶ ..................................................... H04N 5/14
[52] U.S. Cl. ........................... 348/700; 348/701; 348/699
[58] Field of Search ..................................... 348/700, 699, 348/416, 400, 409, 701, 135, 222; 345/328

[56] References Cited

U.S. PATENT DOCUMENTS

| | | | |
|---|---|---|---|
| 5,032,905 | 7/1991 | Koga | 348/700 |
| 5,099,322 | 3/1992 | Gove | 348/700 |
| 5,459,517 | 10/1995 | Kunitake et al. | 348/700 |
| 5,493,345 | 2/1996 | Ishikawa et al. | 348/700 |
| 5,617,149 | 4/1997 | Lee et al. | 348/699 |
| 5,635,982 | 6/1997 | Zhang et al. | 348/231 |
| 5,642,294 | 6/1997 | Taniguchi et al. | 348/700 |

FOREIGN PATENT DOCUMENTS

| | | | |
|---|---|---|---|
| 0 615 245 | 9/1994 | European Pat. Off. | H04N 7/32 |
| WO 94/11995 | 5/1994 | WIPO | H04N 5/76 |

OTHER PUBLICATIONS

B. Balmuth, *Introduction to Film Editing*, Focal Press, 1989.

D. Coll and G. Choma, "Image Activity Characteristics in Broadcast Television," IEEE Trans. on Communications, vol. 26, pp. 1201 1206, 1976.

I. Sethi, V. Salari, and S. Vemuri, "Image Sequence Segmentation using Motion Coherence," Proc. First International Conference on Computer Vision, pp. 667 671, 1987.

Y.Z. Hsu, H.H. Nagel, and G. Rekers, "New Likelihood Test Methods for Change Detection in Image Sequences," CVGIP, 26, pp. 73 106, 1984.

Joint Photographic Experts Group (JPEG); ISO/IEC JTC1 SC29 WG1, JPEG, ISO/IEC 10 918.

Moving Picture Experts Group (MPEG) ISO/IEC JTC1 SC29 WG11, MPEG 1, ISO/IEC 11 172, and MPEG2 ISO/IEC 13 818.

International Telegraph and Telephone Consultative Committee (CCITT) CCITT, Recommendation H.261, Video Codec for Audiovisual Services at px64 kbits/s, Dec. 1990.

H. C. H. Liu and G. L. Zick, "Scene Decomposition of MPEG Compressed Video," SPIE vol. 2419, Digital Video Compression Algorithms and Technologies, pp. 26–37, 1995.

J. Meng, Y. Juan, and S. F. Chang, "Scene Change Detection in a MPEG Compressed Video Sequence," SPIE vol. 2419, Digital Video Compression Algorithms and Technologies, pp. 14–25, 1995.

H. Zhang, C. Y. Low, and S. W. Smoliar, "Video Parsing and Browsing Using Compressed Data," Multimedia Tools and Applications, 1, pp. 89–11, 1995.

(List continued on next page.)

*Primary Examiner*—Tommy P. Chin
*Assistant Examiner*—Vu Le
*Attorney, Agent, or Firm*—Adel A. Ahmed

[57] ABSTRACT

Apparatus for detecting a cut in a video comprises arrangements for acquiring video images from a source, for deriving from the video images a pixel-based difference metric, for deriving from the video images a distribution-based difference metric, and for measuring video content of the video images to provide up-to-date test criteria. Arrangements are included for combining the pixel-based difference metric and the distribution-based difference metric, taking into account the up-to-date test criteria provided so as to derive a scene change candidate signal and for filtering the scene change candidate signal so as to generate a scene change frame list.

25 Claims, 15 Drawing Sheets

OTHER PUBLICATIONS

P. Aigrain and P. Joly, "The Automatic Real Time Analysis of Film Editing and Transition Effects and its Applications," Computer and Graphics, vol. 18, No. 1, pp. 93–103, 1994.

I. K. Sethi and N. Patel, "A Statistical Approach to Scene Change Detection," SPIE vol. 2420, Storage and Retrieval for Image and Video Databases III, pp. 329–338, 1995.

H. Zhang, A. Kankanhalli, and S. W. Smoliar, "Automatic Parsing of Full Motion Video," ACM Multimedia Systems, 1, pp. 10–28, 1993.

A. J. Seyler, "Probability Distributions of Television Frame Differences," Proceedings of I.R.E.E. Australia, pp. 355–366, Nov. 1965.

T. Aach, A. Kaup, and R. Mester, "Statistical Model Based Change Detection in Moving Video," Signal Processing, 31, pp. 165–180, 1993.

J. D. Gibbons and S. Chakraborti, Nonparametric Statistical Inference, Marcel Dekker, Inc., 1992.

A. Hampapur, R. Jain, and T. Weymouth, "Digital Video Segmentation," Proc. ACM Multimedia Conference, pp. 357–363, 1994.

B. L. Yeo and B. Liu, "Rapid Scene Analysis on Compressed Video," IEEE Trans. on Circuits and Systems for Video Technology, 1995.

G. Casella and R. L. Berger, *Statistical Inference*, Duxbury Press, 1990.

A. J. Fox, "Outliers in Time Series," Journal of the Royal Statistical Society, Series B, 34, pp. 350–363, 1972.

B. Abraham and A. Chuang, "Outlier Detection and Time Series Modeling," Technometrics, vol. 31, No. 2, pp. 241–248, May 1989.

L. K. Hotta and M. M. C. Neves, "A Brief Review of Tests for Detection of Time Series Outliers," ESTADISTICA, 44, 142, 143, pp. 103–148, 1992.

B. L. Yeo and B. Liu, "On the Extraction of DC Sequence from MPEG Compressed Video," Proc. of ICIP, Oct., 1995.

L. A. Zadeh and J. Kacprzyk, Fuzzy Logic for the Management of Uncertainty, John Wiley & Sons, Inc., 1992.

U. Grenander and M. Rosenblatt, Statistical Analysis of Stationary Time Series, New York: Wiley, 1966.

J. L. Barron, D. J. Fleet, and S. S. Beauchemin, "Systems and Experiment Performance of Optical Flow Techniques", International Journal of Computer Vision 12:1, pp. 43–77, 1994.

D. J. Connor and J. O. Limb, "Properties of Frame–Difference Signals Generated by Moving Images", IEEE Transactions on Communications vol. COM–22, No. 10, Oct. 1974, pp. 1564–1575.

G. W. Donohoe, D. R. Hush and N. Ahmed, "Change Detection for Target Detection and Classification in Video Sequences", 1988 IEEE, pp. 1084–1087.

Y. Liu and S. D. Blostein, "Quickest Detection of an Abrupt Change in a Random Sequence with Finite Change–Time", IEEE Transactions on Information Theory, vol. 40, No. 6, Nov. 1994, pp. 1985–1993.

P.R. Hsu and H. Harashima, "Detecting Scene Changes and Activities in Video Databases", 1994 IEEE, pp. V–33—V–35.

A. Nagasaka and Y. Tanaka, "Automatic Video Indexing and Full–Video Search for Object Appearances", Visual Database Systems, Elsveier Science Publishers B.V. (North Holland), 1992, pp. 113–127.

Y. Nakajima, "A Video Browsing Using Fast Scene Cut Detection for an Efficient Networked Video Database Access", IEICE Trans. Inf. & Syst., vol. E77–D, No. 12, Dec. 1994, pp. 1355–1364.

K. Otsuji, Y. Tonomura and Y. Ohba, "Video Browsing Using Brightness Data", SPIE vol. 1606, Visual Communications and Image Processing '91: Image Processing, pp. 980–989.

M. Rubin, "NonLinear: A Guide to Electronic Film and Video Editing", Triad Publishing Co., pp. 78–87.

APPARATUS FOR DETECTING A CUT IN A VIDEO

Video is being generated at an ever-increasing rate everyday. In order to use information from such video repositories efficiently and effectively, they must be properly indexed into a database. The most fundamental and important task in this process is to parse the video into an appropriate set of units, which are known as shots. Most existing approaches are based on preset thresholds or improper assumptions which reduce their applicability to a limited range of video types.

The following description of the present invention also includes a mathematical formulation of the problem, a fast and robust implementation of the mathematical formulation, and a cut browsing apparatus. Performance has been demonstrated on over 149,000 video frames that include various video types such as sports and movies.

Sources of videos include defense/civilian satellites, scientific experiments, biomedical imaging, fingerprinting devices, and home entertainment systems. In order to use information from such video repositories efficiently and effectively, videos must be properly indexed into a database. Video indexing provides a fast and accurate way to access desired video data based on its contents. The most fundamental and important task in this process is to parse the video into an appropriate set of units, which are known as shots.

A shot in video refers to a contiguous recording of one or more video frames depicting a continuous action in time and space. In a shot, camera could remain fixed, or it may exhibit one of the characteristic motion such as panning, tilting, or tracking. For most videos, shot changes or cuts are created intentionally by video/film directors. In the early years, they were done on a splicer and an optical printer, while shot lists were kept on paper records, the count sheets.

Since 1985, most shot changes have been generated using modern editing machines. Information on each individual shot is retained electronically on an Editing Decision List (EDL), which can be indexed directly into a database. However, for most videos/films that were produced before the invention of such machines, this information, which was recorded on paper, may no longer be accessible. This is certainly true for home videos and raw sports films, since cuts are generated by turning the camcorders/film cameras on and off. In either case, cuts will have to be detected from the video through manual or automatic means.

Unlike what is claimed in the literature, the isolation of shots in a video is not a trivial task considering the complexity of a scene and the efficacy of modern editing technologies.

The transition from one shot to another may include visually abrupt straight cuts or camera breaks. It may also include such effects as fades, dissolves, wipes, flips, superimposures, freeze or hold frames, flop-overs, tail-to-head reverses, blow-ups, move-ins, repositions, and skip frames. See, for example, B. Balmuth, Introduction to Film Editing, Focal Press, 1989.

Since the purpose of video indexing is to aid the retrieval of desired video clips from a database, it is important that a 100% recall rate and maximum precision rate be maintained. Here, a recall rate is defined as the percentage of the actual cuts that are detected and a precision rate, the percentage of the detected cuts that are actual cuts.

Most existing approaches deal with very specific cases of few of the above transition types and even then a 100% recall rate is never achieved. In addition, they are often tested on few types of videos and few thousand video frames, insufficient to make any realistic judgment on the performance of individual algorithms. Most existing algorithms can not be implemented near video rate, imposing a serious constraint on the range of applications they can be used for. More importantly, they are often based on preset thresholds or improper assumptions which reduce their applicability to a limited range of video types.

Reference is also made to the following U.S. patent applications as containing material of close interest to the present application: U.S. patent application Ser. No. 08/221,227 filed Mar. 31, 1994 in the name of Arman et al.; U.S. patent application Ser. No. 08/221,225 filed Mar. 31, 1994 in the name of Arman et al.; U.S. patent application Ser. No. 08/221,221, filed Mar. 31, 1994 in the name of Arman et al.; U.S. patent application Ser. No. 08/343,793 filed Nov. 22, 1994 in the name of Arman et al.; U.S. patent application Ser. No. 08/346,453, filed Nov. 29, 1994 in the name of Benson et al.

It is herein recognized that a good cut detection method is one that can provide the maximum recall and precision rate for visually abrupt cuts and camera breaks, detect cuts, from reading the video to the output of shot change frames, close or near the video rate, considers the nonstationary nature of the cut detection problem, have a feedback mechanism to achieve a 100% recall rate, work on a variety of videos and big number of video frames, and is independent of the encoders and different encoding algorithms, when applied to compressed video.

In accordance with an aspect of the invention, a method for detecting a cut in a video, comprises the steps of (a) acquiring video images from a source; (b) deriving from the video images a pixel-based difference metric; (c) deriving from the video images a distribution-based difference metric; (d) measuring video content of the video images to provide up-to-date test criteria; (e) combining the pixel-based difference metric and the distribution-based difference metric, taking into account the up-to-date test criteria provided in step (d) so as to derive a scene change candidate signal; and (f) filtering the scene change candidate signal so as to generate a scene change frame list.

In accordance with another aspect of the invention, the pixel-based difference metric for each frame is the summation of an absolute frame difference representative of image intensity value at selected pixel locations in a frame.

In accordance with another aspect of the invention, the pixel-based difference metric for each frame t is the sum of an absolute frame difference, $$\sum_{ij} |f^t_{ij} - f^{t-1}_{ij}|$$

where $f^t_{ij}$ represents the intensity value at pixel location (i,j) in frame t.

In accordance with yet another aspect of the invention, each image is divided into a number of sub-regions and wherein the distribution-based difference metric is a Kolmogorov-Smirnov test metric, except that one each is computed herein for the entire image as well as its sub-regions.

In accordance with yet another aspect of the invention, each image is equally divided into four sub-regions and wherein the distribution-based difference metric is a Kolmogorov-Smirnov test metric, except that one each is computed herein for the entire image as well as the four equally divided sub-regions.

In accordance with yet another aspect of the invention, the step of measuring video content of the video images to provide up-to-date test criteria provides the step (e) with the ability to automatically adjust to different video contents.

In accordance with yet another aspect of the invention, the video images are DC images represented by the base frequency in the Discrete Cosine Transform coefficients characterizing the underlying image frame.

In accordance with still another aspect of the invention, the step of measuring video content of the video images to provide up-to-date test criteria comprises collecting statistics from each DC image and each pair of DC images to represent current video content, being an image contrast and the motion estimate. The image contrast estimate is computed based on a recursive scheme to suppress the influences of sudden lighting changes.

In accordance with still another aspect of the invention, the collecting statistics from each DC image and each pair of DC images to represent current video content represent an image contrast estimate and a motion estimate.

In accordance with still another aspect of the invention, the image contrast estimate is computed based on a recursive scheme to suppress the influences of sudden lighting changes.

In accordance with still yet another aspect of the invention, the image contrast estimate is derived in accordance with the following:

$$contrast_t = (1-\tau)contrast_{t-1} + \tau\sigma_{t-1}$$

where $\sigma_{t-1}$ is the intensity variance estimate of the DC image at time t−1.

In accordance with still yet another aspect of the invention, the image contrast estimate equals 0.6.

In accordance with a further aspect of the invention, the motion estimate is computed as follows:

$$motion_t = (1-\tau)motionL_{t-1} + \tau\sum_{ij}\left(\frac{|f_{ij}^{t-1} - f_{ij}^{t-2}|}{N}\right)$$

where $f^{t-1}_{ij}$ is the intensity value at pixel location (i,j) of the DC image at time t−1, N is the size of the image.

In accordance with another aspect of the invention, $\tau$ equals 0.6.

In accordance with yet a further aspect of the invention, the image contrast and the motion estimates are applied to a fuzzy engine to compute a new significance level for the hierarchical Kolmogorov-Smirnov test, the fuzzy engine using a quadratic membership function, where each contrast measurement is divided into classes, from low to high, and each motion estimate is divided into classes, from slow to fast, and each significance level is divided into classes from high to low.

In accordance with yet a further aspect of the invention, each contrast measurement is divided into four classes, low, middle, high, and extremely high, each motion estimate into three classes, slow, middle, and fast, and each significance level into five classes, high, middle high, middle, middle low, and low, and wherein the fuzzy rules are stated in a simple IF/THEN format, where values are combined using AND (minimum) or OR (maximum) operations.

In accordance with yet a further aspect of the invention, a method for detecting a cut in a video includes a step of defuzzifying the fuzzy rules to yield a crisp final output value, by finding the center of gravity of the combined output shape, whereby all rules are ensured of contributing to the final crisp result.

In accordance with still yet a further aspect of the invention, in the step (e) of combining the pixel-based difference metric and the distribution-based difference metric, taking into account the up-to-date test criteria provided in step (d) so as to derive a scene change candidate signal, the pixel-based difference metrics are treated as time series signals, where both visually abrupt cuts and duplication of frames create observation outliers.

In accordance with still yet a further aspect of the invention, the pixel-based difference metric is treated as a time series signal, where both visually abrupt cuts and the duplication of frames create observation outliers obeying the equation $$d_t = f(d_{t-r}, d_{t-r+1}, \ldots, d_t) + u_t \text{ if } t \neq q$$

$$d_t = f(d_{t-r}, d_{t-r+1}, \ldots, d_t) + u_t + \Delta \text{ otherwise}$$

where t represents the time index, $\Delta$ is the outlier, $f(d_{t-r}, d_{t-r+1}, \ldots, d_t)$ models the trend in the series, and $$u_t = \sum_{r=1}^{p} \alpha_r d_{t-r} + z_t \quad (t = p+1, \ldots, n).$$

In accordance with still a further aspect yet of the invention, apparatus for detecting a cut in a video, comprises: (a) apparatus for acquiring video images from a source; (b) apparatus for deriving from the video images a pixel-based difference metric; (c) apparatus for deriving from the video images a distribution-based difference metric; (d) apparatus for measuring video content of the video images to provide up-to-date test criteria; (e) apparatus for combining the pixel-based difference metric and the distribution-based difference metric, taking into account the up-to-date test criteria provided in step (d) so as to derive a scene change candidate signal; and (f) apparatus for filtering the scene change candidate signal so as to generate a scene change frame list.

In accordance with still another aspect, the invention includes apparatus for detecting a cut in a video in accordance with claim 20, including apparatus for presenting two cross-section images of the video images, a horizontal cross section image one is in a horizontal direction and a vertical cross section image in a vertical direction of the video volume.

In accordance with yet another aspect of the invention, each cross-section image is constructed by sampling one row (or column) from every image, and reducing the amount of information from a two-dimensional image to two one-dimensional image strips.

In accordance with still yet another aspect of the invention, the horizontal and vertical cross-section images are combined into one image segmented into two bands according to a list of detected shots, whereby a level of abstraction is presented that is just enough to reveal whether there is a missed or misdetected shot.

The invention will be more clearly understood from the following detailed description of preferred embodiments, in conjunction with the Drawing, in which FIG. 1 shows that a traditionally used, prior art, cut detection algorithm can be categorized as a process comprising four steps, data acquisition, difference metric collection, detection, and decision, wherein the dashed boxes indicate optional steps which can be found in some algorithms and wherein the delay circuit is a mechanism to utilize information from both the past and the future frames;

FIG. 6 shows examples of cross section patterns in accordance with the invention, wherein

FIG. 14 shows an example of trend estimation, wherein

Figure 1:
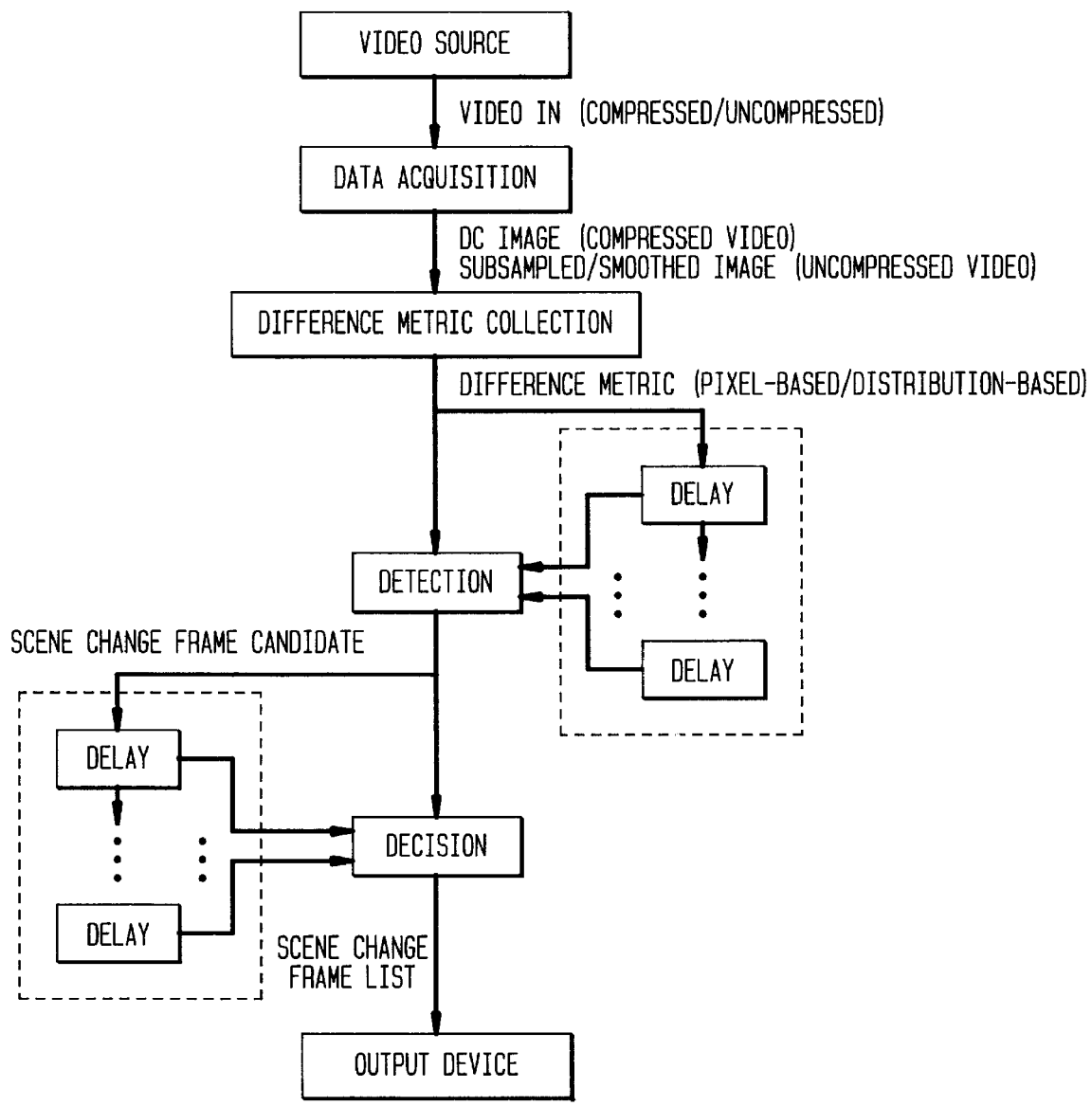

This present invention relates to an automatic cut detection method and a cut browsing apparatus that satisfy all criteria listed above. The cut detection is formulated as a non-stationary time series outlier detection problem.

The efforts on cut detection can be traced back to, for example, D. Coll and G. Choma, "Image Activity Characteristics in Broadcast Television," IEEE Trans. on Communications, Vol. 26, pp. 1201–1206, 1976, where the authors perform an extensive experimental study of frame difference signals using four different types of videos, a football game, a drama show, a talk show, and a cartoon. The authors divide each uncompressed video frame into 8×8 blocks, each of which is represented by its average grayscale value. In their study, the average of the magnitudes of the differences between corresponding blocks of consecutive frames is used as the difference metric. Coll and Choma show that a threshold determined experimentally can detect shot changes that match the accuracy of a human observer. More scene change detection algorithms based on uncompressed video can also be found in the computer vision literature. See for example, I. Sethi, V. Salari, and S. Vemuri, "Image Sequence Segmentation using Motion Coherence," Proc. First International Conference on Computer Vision}, pp.667–671, 1987; Y. Z. Hsu, H.-H. Nagel, and G. Pekers, "New Likelihood Test Methods for Change Detection in Image Sequences," CVGIP, 26, pp. 73–106, 1984. I. Sethi, V. Salari, and S. Vemuri, "Image Sequence Segmentation using Motion Coherence," Proc. First International Conference on Computer Vision, pp.667–671, 1987.

Digital video can be stored and transmitted in compressed form. See, for example, Joint Photographic Experts Group (JPEG); ISO/IEC JTC1 SC29 WG1, JPEG}, ISO/IEC 10 918; Moving Picture Experts Group (MPEG) ISO/IEC JTC1 SC29 WG11, MPEG-1, ISO/IEC 11 172, and MPEG-2, ISO/IEC 13 818, and International Telegraph and Telephone Consultative Committee (CCITT) CCITT, Recommendation H.261, Video Codec for Audiovisual Services at px64 kbits/s, December 1990.

Performing cut detection as well as image processing on compressed video saves unnecessary decompression-compression effort. This idea led to many efforts in pursuing solutions that can process compressed video directly, as disclosed by F. Arman et al. in U.S. patent application Ser. Nos. 08/221,227 and 08/221,227, presently pending and assigned to the same assignee as is the present application. Arman et al. have developed a scene change detection algorithm for JPEG and movie-JPEG video, where a subset of Discrete Cosine Transform (DCT) coefficients is used to characterize the underlying frame. Unfortunately, full DCT coefficients are difficult or impractical to obtain in MPEG or H.261 video without full scale decoding. This is because motion vectors are quantities in the spatial domain, while DCT coefficients are quantities in the frequency domain.

Other researchers have proposed to use motion vectors directly either to filter out scene change frames or to detect scene cuts See, for example, H.-C. H. Liu and G. L. Zick, "Scene Decomposition of MPEG Compressed Video," SPIE Vol. 2419, Digital Video Compression Algorithms and Technologies, pp.26–37, 1995; J. Meng, Y. Juan, and S.-F. Chang, "Scene Change Detection in a MPEG Compressed Video Sequence," SPIE Vol. 2419, Digital Video Compression Algorithms and Technologies, pp.1 4–25, 1995; and H. Zhang, C. Y. Low, and S. W. Smoliar, "Video Parsing and Browsing Using Compressed Data," Multimedia Tools and Applications, 1, pp.89–111, 1995.

They are often based on the ratio of number of forward-predicted macro blocks and the total number of macro blocks. Since there is no standard criterion in determining whether a certain macro block should be inter-coded (temporarily predicted from a previous reconstructed picture) or intra-coded (like a baseline JPEG picture) during the encoding process, this approach is very sensitive to different encoders and types of encoding algorithms.

Most cut detection algorithms in the literature, whether or not they take uncompressed or compressed video data, can be categorized, as a process comprising four steps: data acquisition, difference metric collection, detection, and decision, as illustrated in FIG. 1. The dashed boxes indicate optional steps, which are found in some algorithms. The delay circuit is a mechanism to use information from both past and future frames.

During the data acquisition stage, compressed video based approaches often extract DCT coefficients or motion vectors. See, for example, the above-cited application of Arman et al.; H. Ishikawa and H. Matsumoto, "Method for Detecting a Scene Change and Image Editing Apparatus," European Patent 0-615-245-A2, filed Jul. 3, 1994; H.-C. H. Liu and G. L. Zick, "Scene Decomposition of MPEG Compressed Video," SPIE Vol. 2419, Digital Video Compression Algorithms and Technologies, pp.26–37, 1995. There are a total of 64 DCT coefficients, including one DC (the base frequency in the DCT coefficients) term and 63 AC (the higher frequencies in the DCT coefficients) terms. The amount of decoding varies among different algorithms. Some only decode DC terms, see, for example, J. Meng, Y. Juan, and S.-F. Chang, "Scene Change Detection in a MPEG Compressed Video Sequence," SPIE Vol. 2419, Digital Video Compression Algorithms and Technologies, pp.14–25, 1995, while others only extract the number of forward-coded and backward-coded motion vectors, see, for example, H.-C. H. Liu and G. L. Zick, "Scene Decomposition of MPEG Compressed Video," SPIE Vol. 2419, Digital Video Compression Algorithms and Technologies, pp.26–37, 1995.

Most such algorithms try to avoid full scale decoding in order to be computationally efficient. For approaches that use uncompressed video data, each digitized image is often smoothed or sub-sampled; see, for example, P. Aigrain and P. Joly, "The Automatic Real-Time Analysis of Film Editing and Transition Effects and its Applications," Computer and Graphics, Vol. 18, No. 1, pp.93–103, 1994.

Once video data is acquired, except for those algorithms that use motion vector information explicitly, most in the literature collect one difference metric per frame. Such difference metric, in general, can be categorized into pixel-based and distribution-based types.

In the pixel-based category, the most popular difference metric is the sum of squared difference, namely $$d_t = \Sigma_{ij}(f^t_{ij} - f^{t-1}_{ij})^2$$

where $f^t_{ij}$ represents the intensity value at pixel location (i, j) in frame t. An alternative choice for less computation is the sum of absolute difference $$d_t = \Sigma_{ij}|f^t_{ij} - f^{t-1}_{ij}|$$

Both difference metrics are sensitive to large camera moves, leading to numerous false positives in cut detection. To overcome this problem, many researchers either smooth video frames, or down sample them, before taking the pixel based differences. This additional step often improves the precision rate of cut detection algorithms significantly.

Distribution-based difference metrics, on the other hand, are less influenced by camera moves. A likelihood measure was first proposed in the late 70's based on the intensity mean and variance of the current and the previous frame. See, for example, Y. Z. Hsu, H.-H. Nagel, and G. Pekers, "New Likelihood Test Methods for Change Detection in Image Sequences," CVGIP, 26, pp. 73–106, 1984. If $\mu_t$ and $\sigma_t$ are used to represent the intensity mean and variance of the frame t respectively, the likelihood based difference metric can be defined as $$d_t = \frac{\left[\frac{\sigma_t + \sigma_{t-1}}{2} + \left(\frac{\mu_t - \mu_{t-1}}{2}\right)^2\right]^2}{\sigma_t \sigma_{t-1}} \tag{1}$$

Other existing distribution-based difference measure are based on histograms. The image histograms of the $t^{th}$ frame is denoted by $H_t$. Let $H_t(j)$ be the pixel counts in bin j of the histogram $H_t$. If the total number of bins is N, one can compute either:

$$d_t = \sum_{j=1}^{N} \frac{|H_t(j) - H_{t-1}(j)|^2}{H_{t-1}(j)} \tag{2}$$

or $$d_t = \sum_{j=1}^{N} \frac{(H_t(j) - H_{t-1}(j))^2}{(H_t(j) + H_{t-1}(j))^2} \tag{3}$$

Either one of them can be used as a distribution-based difference metric. The bin size N in either measure affects the sensitivity of the cut detection algorithm. The smaller the bin size is, the more sensitive the histogram measure will be. In most existing methods, a fixed bin size is used throughout all intensity ranges.

Recently, a third type of distribution-based difference metric has been proposed. See, for example, I. K. Sethi and N. Patel, "A Statistical Approach to Scene Change Detection," SPIE Vol. 2420, Storage and Retrieval for Image and Video Databases III, pp. 329–338, 1995. This metric is based on the empirical distribution function (EDF) of the previous and current frames. It is called the Kolmogorov-Smirnov test metric.

$$d_t = max_j |EDF_t(j) - EDF_{t-1}(j)| \tag{4}$$

In order to compute the empirical distribution function, one first constructs the histogram of each individual video frame. Assume that the histogram for frame t is represented by $\{H_t(j)|j=1,N\}$. $EDF_t(j)$, which represents the cumulative distribution probability of the jth intensity value in frame t, can then be defined by $$EDF_t(1) = \frac{H_t(1)}{M}$$

$$EDF_t(j) = EDF_t(j-1) + \frac{H_t(j)}{M}, j = 2, N$$

where M is the total number of pixels in the image.

After the difference metric is collected for each frame, most algorithms simply apply a preset threshold to this time series of difference metrics. The algorithm compares the value of difference metric with a global threshold. If it is above this preset number, a shot change is signaled. Since it is difficult to find such a threshold for an entire video, some researchers have also proposed the use of two thresholds. See, for example, H. Zhang, A. Kankanhalli, and S. W. Smoliar, "Automatic Parsing of Full-Motion Video," ACM Multimedia Systems, 1, pp.10–28, 1993.

Recently, rank-based detection schemes have become very popular. See, for example, P. Aigrain and P. Joly, "The Automatic Real-Time Analysis of Film Editing and Transition Effects and its Applications," Computer and Graphics, Vol. 18, No. 1, pp.93–103, 1994.

Since global thresholds are hard to find, the idea is that thresholds should be applied only to difference metrics in a local temporal neighborhood. This local temporal neighborhood approach is indicated as the dashed box attached to the detection step in FIG. 1. In order for this to work, a new difference metric is computed in the detection step from every local temporal window centered around the current frame. Denote $d_t$ as the difference metric for frame t in the form of sum of squared differences (or sum of absolute differences) and assume that the size of the temporal window is 2N+1. If the 2N+1 observations $d_i$, i=t−N, t+N are ordered $\hat{d}_1 < \hat{d}_2 < \ldots < \hat{d}_{2N+1}$, the new metric $\hat{d}_t$ is often computed in one of the following three ways.

$$\tilde{d}_t = 0 \text{ if } d_t \neq \hat{d}_{2N+1}; \tag{Eq. 5}$$

$$\tilde{d}_t = \frac{\hat{d}_{2N+1}}{\hat{d}_{2N}} \text{ otherwise}$$

or $$\tilde{d}_t = 0 \text{ if } d_t \neq \hat{d}_{2N+1}; \tag{Eq. 6}$$

$$\tilde{d}_t = \hat{d}_{2N+1} - \hat{d}_{2N} \text{ otherwise}$$

or $$\tilde{d}_t = 0 \text{ if } d_t \neq \hat{d}_{2N+1};$$

-continued $$\tilde{d}_t = \frac{\tilde{d}_{2N+1}}{\sum_{i=1}^{2N} \tilde{d}_i} \text{ otherwise} \qquad \text{Eq. 7}$$

The preset threshold will then be applied to this sequence of new metrics $\tilde{d}_t$. Most algorithms that use Equation 5 or Equation 7 favor N=2 and a number between 3 and 4 as the best threshold choice.

All detection schemes discussed so far are based on preset thresholds and they do not treat cut detection as a hypothesis testing problem. On the other hand, there are a few cut detection algorithms, that are based on hypothesis testing paradigms. All such algorithms can be categorized into two different types. The first formulation views a sequence of difference metrics as a set of samples drawn from a single known distribution, if they are derived from images within the same shot. The second formulation views them as a set of samples drawn from a single but unknown distribution. Note here that the difference metric could be computed from each individual frame or from any two neighboring frames. These formulations transform the cut detection problem into the following two problems respectively:

Case 1: Can one disprove, to a certain required level of significance, the null hypothesis that difference metric is a sample drawn from a known distribution?

Case 2: Can one disprove, to a certain required level of significance, the null hypothesis that the previous and the current difference metric are samples drawn from the same distribution?

In both cases, either pixel-based or distribution-based difference metrics can be used. However, the underlying distribution in the second case does not have to be known in advance. Each formulation will next be explained in more detail.

Regarding Case 1, work on modeling frame difference signals can be traced back to the 1960's. Seyler first studied the nature of frame difference signals and showed that the gamma distribution provides a good fit to the probability density function of the fraction of pixels whose change is above a threshold. See A. J. Seyler, "Probability Distributions of Television Frame Differences,"0 Proceedings of I.R.E.E. Australia, pp.355–366, November 1965. An analytic expression is derived for the probability density functions approximating the experimentally recorded frame difference distributions and is simply the following:

$$h(\overline{D}) = (\Gamma(\alpha) \beta^\alpha)^{-1} \overline{D}^{\alpha-1} \exp\left(-\frac{\overline{D}}{\beta}\right)$$

where $\overline{D}$ is the fraction of pixels whose change is above a threshold and the parameters $\alpha$ and $\beta$ are given by the computed mean $\mu_{\overline{D}}$ and standard deviation $\sigma_{\overline{D}}$ of the experimental distribution, as $$\alpha = \left(\frac{\mu_{\overline{D}}}{\sigma_{\overline{D}}}\right)^2 \quad \beta = \frac{\sigma_{\overline{D}}^2}{\mu_{\overline{D}}}$$

It is however not clear how sensitive this conclusion is to the choice of thresholds.

An alternative model for frame difference signals is that the corresponding difference $d_{ij}(=f^n_{ij}-f^{n-1}_{ij})$ at pixel location (i, j) follows a zero-mean Gaussian distribution with variance $\sigma^2_{ij}$. The unknown parameter $\sigma_{ij}$ can be estimated from the image sequence directly. To simplify the model, it is often assumed that the random variables are i.i.d. (independently identically distributed), therefore $\sigma_{ij} = \sigma$ for all $(i,j)$ Following this, it is shown in T. Aach, A. Kaup, and R. Mester, "Statistical Model-Based Change Detection in Moving Video," Signal Processing, 31, pp 165–180, 1993 that $$\sum_{ij}\left(\frac{d_{ij}}{\sigma}\right)^2$$

obeys a $\chi^2$ distribution with as many degrees of freedom as the number of pixels in the image.

$d_{ij}$ can also be modeled as obeying a Laplace distribution, i.e., $$p(d_{ij}) = \frac{\gamma}{2} \exp\{-\gamma|d_{ij}|\}$$

where $$\gamma = \frac{\sqrt{2}}{\sigma}$$

and $\sigma^2$ is the variance of this probability density function. It is then shown in Aach et al. op. cit. that $p(2\Sigma\gamma|d_{ij}|)$ follows a $\chi^2$ distribution with twice as many degrees of freedom as the number of pixels in the image.

Among distribution-based difference metrics, the difference metric constructed using equation (1) is based on the assumption that images are samples drawn from $N(\mu_t, \sigma_t)$. This metric is essentially the maximum likelihood ratio of $$\frac{L(H_1)}{L(H_0)},$$

where L(x) is the likelihood of event x and
$H_0$: frames t–1 and t come from the same distribution $N(\mu_{t-1}, \sigma_{t-1})$
$H_1$: frames t–1 and t come from different distributions $N(\mu_{t-1}, \sigma_{t-1})$
and $N(\mu_t, \sigma_t)$.

For the difference metric constructed using equation (2) and (3), it can also be shown that both satisfy the $\chi^2$ distribution. See J. D. Gibbons and S. Chakraborti, Nonparametric Statistical Inference, Marcel Dekker, Inc., 1992 The $\chi^2$ test detects whether an observed frequency distribution in a sample arise from the assumed theoretical distribution. Such distributions could be a true binomial, Poisson, normal, or some known type of distribution in the population. Usually, the parameters of this distribution is not known. It may be shown that, if s parameters are estimated by the method of maximum likelihood, the limiting distribution of $$\sum_{j=1}^{N} \frac{|H_t(j) - H_{t-1}(j)|^2}{H_{t-1}(j)}$$

is that of $\chi^2$ with N–s–1 degrees of freedom.

For Case 2, the most commonly used statistical approach of this type is the Kolmogorov-Smirnov test. The Kolmogorov-Smirnov test is concerned with the agreement of two sets of observed values and the null hypothesis is that two samples come from populations with the same distribution function F(x). It can be shown that the test statistic $d_t$ as in Equation (4) satisfies $$\text{Prob}\left(d_t > K_\alpha \sqrt{\frac{2}{N}}\right) = \alpha$$

where $K_\alpha$ represents a constant depending on the level of significance $\alpha$ and is available in tabular form from most statistics books. N is the size of the image the statistic is collected upon.

Unlike the test discussed just above, the Kolmogorov-Smirnov test does not assume any it a priori information about the type of distribution functions.

The decision stage is often set up to eliminate detected cuts that are false positives due to flash light or slow/fast motion in the scene. The list of detected cut frames is stored in a delay memory as shown by the dashed box attached to the decision step in FIG. 1. The criterion usually states that the minimum distance between two cuts has to be greater than a preset number.

Most existing approaches are based on preset thresholds or improper assumptions which reduce their applicability to a limited range of video types. For example, incorrect assumptions have frequently been made about how shots are connected in videos, ignoring the realities of how films/videos are produced and edited. The nonstationary nature of the cut detection problem has often been ignored, as well as the fact that many videos are converted from films in the design of their cut detection algorithm.

In the following section, the cut detection problem will be examined from several different viewpoints. Since most shots and shot changes are created intentionally by film/video directors, it is very important to understand techniques commonly used by film/video production and editing professionals. This will provide an idea what types of shots and cuts could be present in films/videos. The commonly used techniques to convert films to videos will also be reviewed. This understanding is very important for developing a robust cut detection algorithm. Finally, different assumptions made by existing methods will be explained and absolution in accordance with the invention will be described.

In the field of film/video production, a few shot classifications are established for directors, camera operators, and editors so that they can use the same language when talking about particular shots. There are three typical shots present in most films/videos.

static shots, which are taken without moving the camera
  The various types of static shots fall into five categories: close-up, close, medium, full, and long. Different static shots induce different amounts of change from frame to frame. For example, an object's movement in a close shot will produce more significant changes in comparison with a medium or long shot.
camera moves
  The various types of camera moves include zooms, tilts, and pans, or a mixture of the above. The change from frame to frame is a function of the speed at which camera moves. For example, a fast camera pan will induce more significant changes in comparison with a slow camera pan.
tracking shots, where the camera is moved during the shot
  The most popular tracking shots include walking shots, dolly shots, and crane shots. All tracking shots have the tendency to induce unsteadiness, in particular when the object being tracked moves too fast. It is obvious that the amount of change from frame to frame is also a function of how steadily the camera tracks the object.

Since camera/object motion in different shot types result in different amounts of intensity change, the criteria to detect cuts should be different when different types of shots are processed. Otherwise, many false positives and false negatives could occur and thus reduce the recall and the precision rate. Unfortunately, in the type of problem this invention disclosure addresses, shot types are not known in advance. How to adjust the detection criteria to different shot types becomes one of the most important tasks in cut detection.

Figure 2:
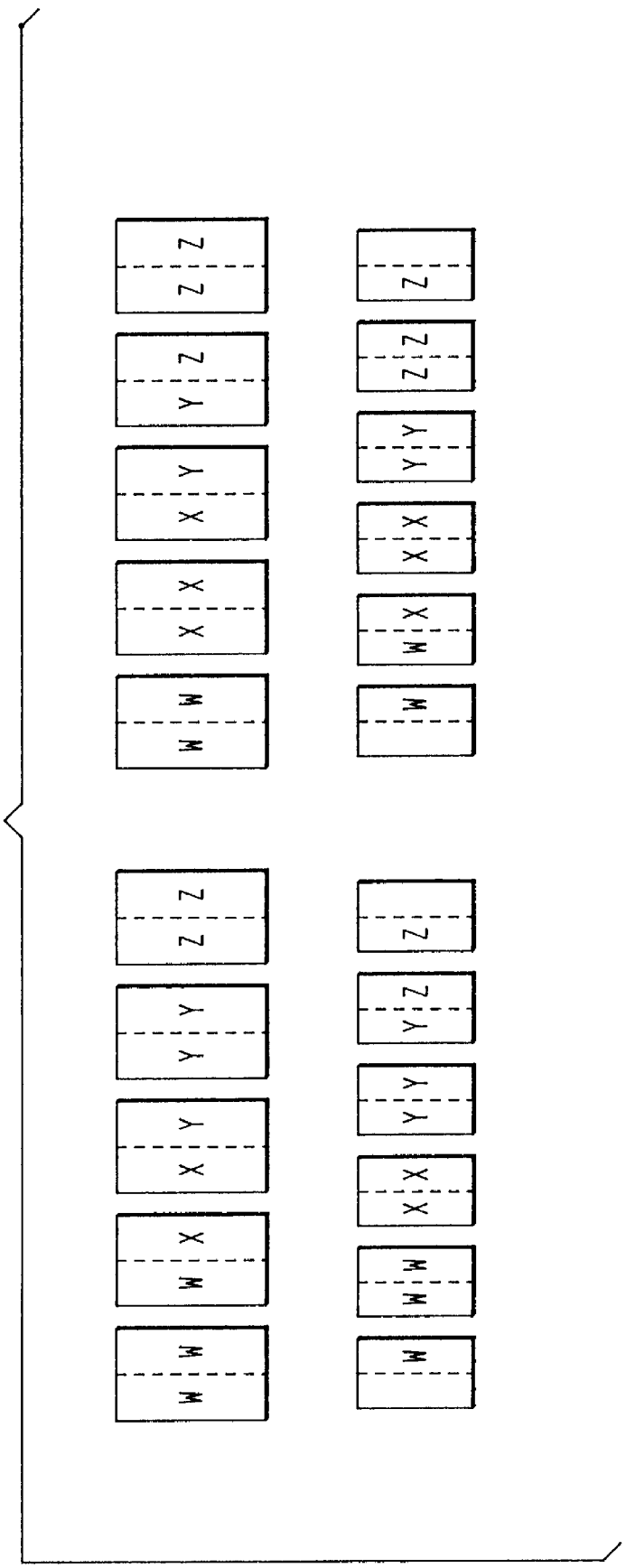
FIG. 2 shows four types of 3:2 pulldown.

Another important issue to be looked at is the fact that many videos are converted from films, because the two are played at different frame rates. A common conversion process, called a 3–2 pull down, is to make every other film frame a little bit longer. This process is often performed by a telecine machine and may affect many cut detection algorithms. As shown in FIG. 2, there are actually four different ways that the 3:2 transfer can take place, as follows. In FIG. 2, W, X, Y, Z are four film frames, each of which contains of two fields. By manipulating these field images, one can construct five video frames. (upper left) starting on field 1, alternating 3 fields (upper right) starting on field 1, alternating 2 fields (lower left) starting on field 2, alternating 3 fields (lower right) starting on field 2, alternating 2 fields.

Thus:
1. starting on field 1, alternating 3 fields, then 2 . . . 3 . . . 2 . . . 3 . . . 2.
2. starting on field 1, alternating 2 fields, then 3 . . . 2 . . . 3 . . . 2 . . . 3.
3. starting on field 2, alternating 3 fields, then 2 . . . 3 . . . 2 . . . 3 . . . 2.
4. starting on field 2, alternating 2 fields, then 3 . . . 2 . . . 3 . . . 2 . . . 3.

In any case, certain video frames are made up of two fields with totally different (although consecutive) pictures in them. As a result, the digitizer can only take one field from each video frame in order to maintain good picture quality. This will result in duplicated frames and almost zero inter-frame differences at five frame intervals in all four cases of 3:2 pulldown. For cut detection methods that are based on pixel-based difference metrics, this may lead to numerous false positives. That is the reason why many existing algorithms based their detection on difference metrics collected in a five or seven frame interval centered around the current frame. See, for example, P. Aigrain and P. Joly, "The Automatic Real-Time Analysis of Film Editing and Transition Effects and its Applications," Computer and Graphics, Vol. 18, No. 1, pp.93–103, 1994; H. Dubner, "Video Logging System and Method Thereof," International Patent Classification H04N9/79,5/76, Application Filed November 1993; T. Koga, "Accurate Detection of a Drastic Change Between Successive Pictures," U.S. Pat. No. 5,032,905, Jul. 16, 1991. A similar problem occurs in animated videos such as cartoons except it produces almost zero inter-frame differences in as often as every other frame.

Most shot transitions are created by film/video directors. Before the invention of modern editing machines, it is often done on a splicer and an optical printer. The following are the most common shot transition and special effect types that can be created by such devices:

fade in, the incoming scene gradually appears, starting from dark
fade out, the outgoing scene gradually disappears, ending in black
dissolve, comprises an outgoing scene, which fades out, and an incoming scene, that fades in and overlaps the outgoing scene
the incoming scene is used to literally wipe off the outgoing scene by means of a hard-edged or soft-edged line, as the incoming scene becomes solely and completely visible flip, a widening black stripe either on both sides or on both tops of the picture frame, that squeezes out the outgoing scene and simultaneously brings in the incoming scene, thus creating an extremely fast turnover, or revolving, effect freeze frame), a particular frame is selected to repeat for any desired length for dramatic or comedic effect flop-over, an effect often used to correct misdirection tail-to-head reversal, the tail, or end, of the cut becomes the head and the head, the tail.

skip frames, the elimination of frames to speed up the action double printing, the duplicate of frames to slow down the action blow up, the blow up of frames to eliminate certain unwanted objects move-in, ending in a dissolve to another moving shot reposition, adjusting the original angle of a shot superimposure, the overlapping of two or more scenes which, unlike those in a dissolve, are simultaneously of constant relative strength.

montage, any sequence of superimposures

Modern computer technology allows even more ways to create shot transitions. The following are some examples.

band wipe, the incoming scene is revealed under the outgoing scene by horizontal or vertical bars barn doors, the incoming scene is revealed under the outgoing scene from the center outwards center merge, the outgoing scene splits into four parts and slides to the center to reveal the incoming scene center split, the outgoing scene splits into four parts and slides to the corner to reveal the incoming scene checkerboard, two sets of alternating boxes wipe to reveal the incoming scene cross stretch, the incoming scene stretches from an edge as the outgoing scene shrinks For transitions made through visually abrupt straight cuts or camera breaks, the cut detection problem is a relatively well-defined task. However, detecting other types of transitions such as fades, dissolves, wipes, flips, superimposures, freeze or hold frames, flop-overs, tail-to-head reverses, blow-ups, move-ins, repositions, and skip frames, may not be as straightforward. As a matter of fact, most scene transition can be any length an editor wishes, as long as it is consistent with the style, mood, and pacing desired at that moment in the picture. Therefore, the collected difference metrics associated with these shot transitions are often indistinguishable from those associated with gradual camera moves, unless semantic level information such as the image motion pattern is also considered. See, for example, H. Zhang, A. Kankanhalli, and S. W. Smoliar, "Automatic Parsing of Full-Motion Video," ACM Multimedia Systems, 1, pp.10–28, 1993.

Many existing methods try to model various varieties of shot transitions. See, for example, P. Aigrain and P. Joly, "The Automatic Real-Time Analysis of Film Editing and Transition Effects and its Applications," Computer and Graphics, Vol. 18, No. 1, pp. 93–103, 1994; A. Hampapur, R. Jain, and T. Weymouth, "Digital Video Segmentation," Proc. ACM Multimedia Conference, pp.357–363, 1994; J. Meng, Y. Juan, and S.-F. Chang, "Scene Change Detection in a MPEG Compressed Video Sequence," SPIE Vol. 2419, Digital Video Compression Algorithms and Technologies, pp.14–25, 1995; JPEG ISO/IEC JTC1 SC29 WG1, JPEG, ISO/IEC 10 918; T. Koga, "Accurate Detection of a Drastic Change Between Successive Pictures," U.S. Pat. No. 5,032,905, Jul. 16, 1991; MPEG ISO/IEC JTC1 SC2 . B.-L. Yeo and B. Liu, "Rapid Scene Analysis on Compressed Video," To appear in IEEE Trans. on Circuits and Systems for Video Technology, 1995. They often assume that both the incoming and outgoing shots are static scenes and the transition only lasts no longer than half a second. This type of model is too simplified to model gradual shot transitions that are often present in films/videos.

Figure 3A:
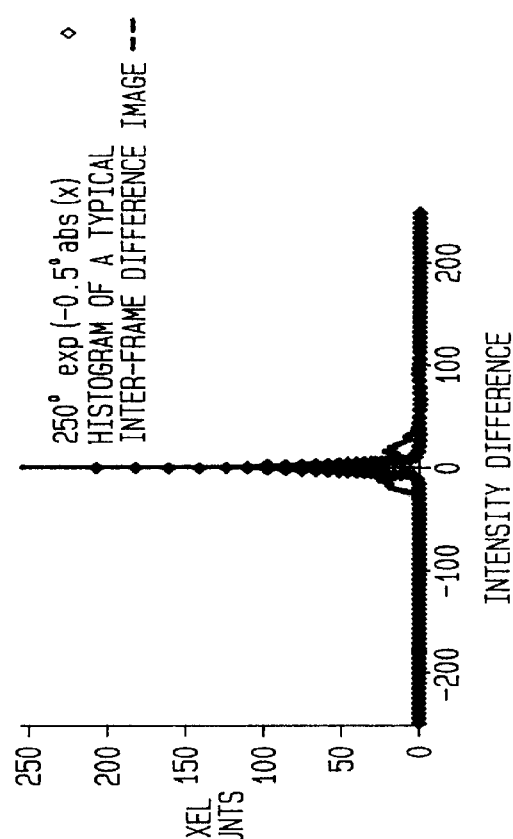
FIG. 3 show a histogram of a typical inter-frame difference image that does not correspond to a shot change.
Figure 3B:
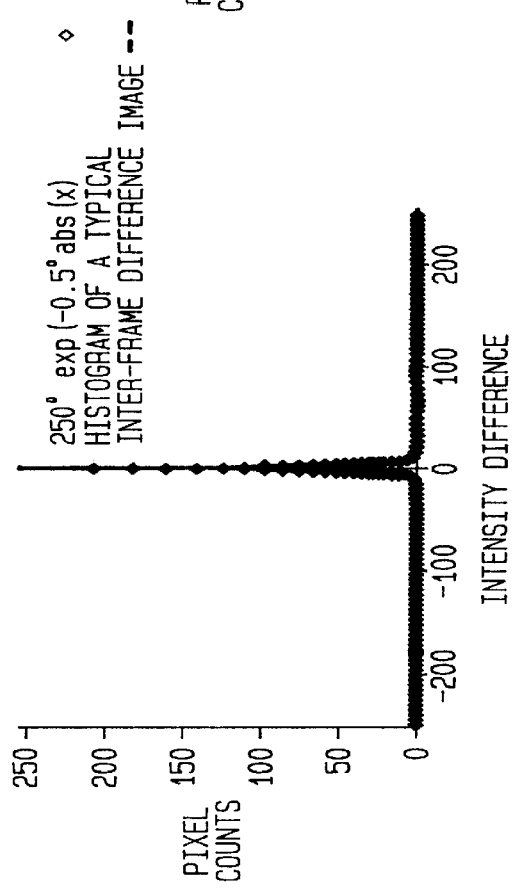

Another assumption researchers often make is that the frame difference signal computed at each individual pixel can be modeled by a stationary independently identically distributed random variable which obeys a known probability distribution such as the Gaussian or Laplace. See, for example, H. Zhang, A. Kankanhalli, and S. W. Smoliar, "Automatic Parsing of Full-Motion Video," ACM Multimedia Systems, 1, pp.10–28, 1993. This assumption is generally not true, as shown in FIG. 3 which shows the histogram of a typical inter-frame difference image that does not correspond to a shot change. Note that the shape changes as camera moves (left) slowly versus (right) fast. Neither a Gaussian nor a Laplace fits both curves well. A Gamma function fits the left curve well, but not the right curve.

This fact invalidates cut detection approaches that are based on $\chi^2$ tests since these tests are derived statistically from the above assumption. See, for example, G. Casella and R. L. Berger, Statistical Inference, Duxbury Press, 1990.

In addition, existing methods assume that time-series difference metrics are stationary, completely ignoring the fact that such metrics are highly correlated time signals.

It is herein recognized that pixel-based and distribution-based difference metrics respond differently to different types of shots and shot transitions. For example, the former is very sensitive to camera moves, but is a very good indicator for shot changes. On the other hand, distribution-based metrics are relatively insensitive to camera and object motion, but can produce little response when two shots look quite different but have similar distributions. It is an object of the present invention to combine both measures in cut detection.

Unlike existing methods which have no notion of time series nor non-stationarity, the present invention treats a sequence of difference metrics as nonstationary time series signals and models the time trend deterministically. The sequence of difference metrics, no matter how they are computed, are just like any economic or statistic data collected over time. In this view, shot changes as well as the 3:2 pull-down process will both create observation outliers in time series, while the gradual shot transition and gradual camera moves will produce innovation outliers. Fox defines the observation outlier to be the one that is caused by a gross error of observation or recording error and it only affects a single observation. See A. J. Fox, "Outliers in Time Series," Journal of the Royal Statistical Society, Series B, 34, pp. 350–363, 1972.

Similarly, the innovation outlier is the one that corresponds to the situation in which a single "innovation" is extreme. This type of outlier affects not only the particular observation but also subsequent observations. A typical model that represents observation outliers (occurs at t=q) is $$d_t = f(d_{t-r}, d_{t-r+1}, \ldots, d_t) + u_t \text{ if } t \neq q$$
$$d_t = f(d_{t-r}, d_{t-r+1}, \ldots, d_t) + u_t + \Delta \text{ otherwise} \qquad \text{Eq. 8}$$

where t t represents the time index, α is the outlier, $f(d_{t-r}, d_{t-r+1}, \ldots, d_t)$ models the trend in the series, and $$u_t = \sum_{r=1}^{p} \alpha_r d_{t-r} + z_t \quad (t = p+1, \ldots, n) \qquad \text{Eq. 9}$$

In Equation (9), $\alpha_r$ are autoregressive parameters and the $\{z_t\}$ are independently $N(0,\sigma^2_z)$ (zero mean normal distribution with variance $\sigma^2_z$).

The model for innovation outliers is $$d_t = f(d_{t-r}, d_{t-r+1}, \ldots, d_t) + \sum_{r=1}^{p} \alpha_r d_{t-r} + \Delta_t + z_t \qquad \text{Eq. 10}$$

where $\alpha_r$ and $\{z_t\}$ are defined as for equation (9) and the outlier $\Delta_t$ affects $d_t$ and, through it, subsequent observations $d_{t+1}, d_{t+2}, \ldots, d_n$.

There are standard methods in the literature which detect both outliers. See, for example, B. Abraham and A. Chuang, "Outlier Detection and Time Series Modeling," Technometrics, Vol. 31, No. 2, pp.241–248, May 1989; A. J. Fox, "Outliers in Time Series," of the Royal Statistical Society, Series B, 34, pp. 350–363, 1972, L. K. Hotta and M. M. C. Neves, "A Brief Review of Tests for Detection of Time Series Outliers," ESTADISTICA, 44, 142, 143, pp. 103–148, 1992.

These standard methods, however, can not be applied to the cut detection problem directly as yet for the following three reasons. First, most methods require intensive computation for example, least squares, to estimate time trend and autoregressive coefficients. This amount of computation is generally not desired. Second, the observation outliers created by slow motion and the 3:2 pull-down process could occur as often as one in every other sample, making the time trend and autoregressive coefficient estimation an extremely difficult process. Finally, since gradual shot transitions and gradual camera moves are indistinguishable in most cases, location of gradual shot transitions requires not only detection of innovation outliers but also an extra camera motion estimation step.

In the solution in accordance with the present invention, a zero-th order autoregressive model and a piecewise-linear function are used to model the time trend. With this simplification, samples from both the past and the future must be used in order to improve the robustness of time trend estimation. More than half of samples are discarded because the observation outliers created by slow motion and the 3:2 pull-down process could occur as often as one in every other sample. Fortunately, these types of observation outliers are least in value, and therefore could be identified easily.

After the time trend is removed, the remaining value is tested against a normal distribution $N(0,\sigma)$, which $\sigma$ can be estimated recursively or in advance.

To make the cut detection method more robust, a further application is made of the Kolmogorov-Smirnov test to eliminate false positives. This test is chosen because it does not assume a priori knowledge of the underlying distribution function. The traditional Kolmogorov-Smirnov test procedure compares the computed test metric with a preset significance level (normally at 95%). It has been used by some researchers to detect cuts from videos. See, for example, I. K. Sethi and N. Patel, "A Statistical Approach to Scene Change Detection," SPIE Vol. 2420, Storage and Retrieval for Image and Video Databases III, pp. 329–338, 1995. This use of single preselected significance level completely ignores the nonstationary nature of the cut detection problem. It is herein recognized that the Kolmogorov-Smirnov test is properly used only if it takes into account the nonstationary nature of the problem. In other words, the significance level should be automatically adjusted to different types of video contents.

One way to represent video contents is to use measurement in both the spatial and the temporal domain together. For example, image contrast is a good spatial domain measurement, because the amount of intensity changes across two neighboring frames measures video content in the temporal domain. The adjustment should be made such that, the higher the image contrast is (that is, the less the significance level), the more sensitive the cut detection mechanism should be, and the more changes occur in two consecutive images, the less sensitive the detection mechanism (that is, the higher the significance level) should be.

The traditional Kolmogorov-Smirnov test also can not differentiate the long shot from the close up of the same scene. To guard against such transitions, the present invention utilizes a hierarchical Kolmogorov-Smirnov test. In this hierarchical Kolmogorov-Smirnov test, each frame is divided into four rectangular regions of equal size and the traditional Kolmogorov-Smirnov test is applied to every pair of regions as well as to the entire image. This test therefore produces five binary numbers which indicate whether there is a change in the entire image as well as in each of the four sub-images.

Finally, instead of directly using these five binary numbers to eliminate false positives, the test result is only used in a qualitative sense. The significance in test result of the shot change frame is compared against that of its neighboring frames. These modifications will become better understood in a later portion of the description.

Despite many claims and attempts in the literature regarding detecting gradual shot changes, it is not possible to differentiate gradual shot transitions from gradual camera moves, since difference metrics associated with both cases are often indistinguishable. Zhang et al. present a hybrid algorithm that tries to differentiate gradual shot transitions from gradual camera moves based on camera motion analysis. See, for example, H. Zhang, C. Y. Low, and S. W. Smoliar, "Video Parsing and Browsing Using Compressed Data," Multimedia Tools and Applications, 1, pp.89–111, 1995. However, it should be noted that camera motion estimation has been an active area of research in computer vision for more than a decade and a reliable motion estimation algorithm is yet to be seen. In the context of the present invention, it is recognized herein that, since no single cut detection algorithm can deliver 100\% recall rate, a cut browsing apparatus is required to provide access to misdetected shots. This browsing apparatus could also be used to identify gradual shot transitions. How will the browsing apparatus provide information to users without the need to play back the entire video is the most challenging task in designing such an apparatus.

In order to provide information to a user who can then identify missed and misdetected shots, this browsing apparatus should have the following three characteristics:

First, it must present information different from what automatic cut detection algorithm extracts from the video. In addition, it should not try to present interpreted information to the user, since any such information could be the source of an error. Finally, the browsing apparatus should be fast and concise, providing another level of abstraction such that the need to play back the entire video can be avoided.

In the context of the present invention, browsing apparatus comprises a video player, a video browser, and a cut browser. See FIG. 4. The browsing apparatus forms the subject matter of a copending U.S. patent application Ser. No. 08/576,271, entitled CUT BROWSING AND EDITING APPARATUS, filed on even date herewith in the name of the present inventors, and whereof the disclosure is herein incorporated by reference. The video browser forms the subject matter of U.S. patent application Ser. No. 08/221,225, entitled REPRESENTING CONTENTS OF A SINGLE VIDEO SHOT USING RFRAMES, in the name of Arman et al., included, without its claims) in the present application as Appendix 1.

These three components provide three different levels of abstraction. Further details will be presented further on, but briefly, the cut browser presents two cross-section images, one is in a horizontal direction and the other in a vertical direction of the video volume. Each cross-section image is constructed by sampling one row (or column) from every image, and reducing the amount of information from a two-dimensional image to two one-dimensional image strips as shown in FIG. 5, in which (a) shows two cross sections in video volumes and (b) shows a space-time image made up of two cross sections.

The horizontal and vertical cross-section images are combined, in the cut browser, into one image segmented into two bands according to the list of detected shots. This representation provides a level of abstraction just enough to reveal whether there is a missed or misdetected shot.

This representation allows the user to easily search the content of the video, to decide if the cut detection method may have missed or misdetected a shot, and to create or eliminate cuts in preparation for a multimedia content.

Figure 5A:
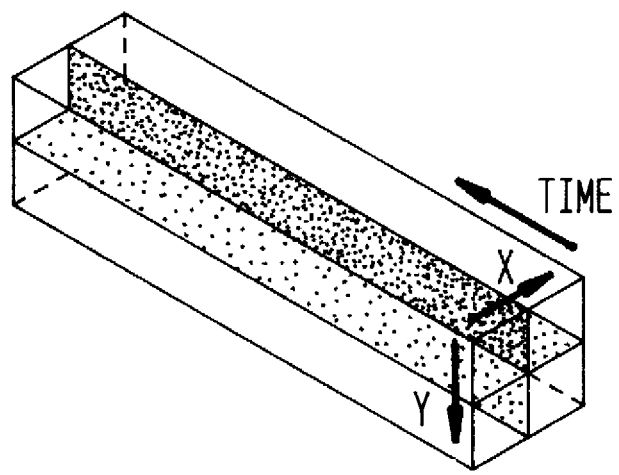
FIG. 5(a) shows two cross sections in video volumes and FIG. 5(b) shows a space-time image made up of two cross sections, useful in understanding the invention.
Figure 5B:
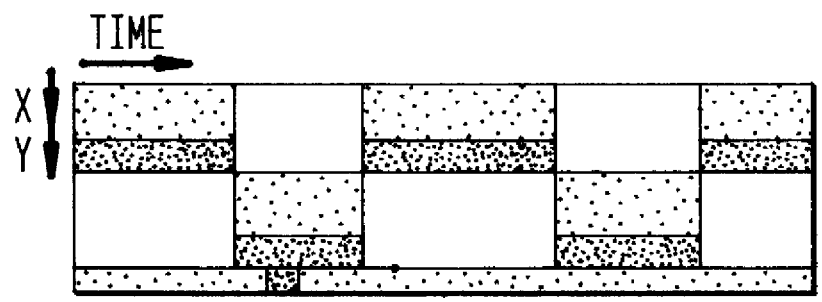

This particular set of three levels of abstraction is chosen for the following reasons. First, the original video must be included because it is the only raw information available. However, no one can afford to search information from the original video directly because video playback is a very time-consuming task. That is a reason to include the representative frames (Rframes) of each detected shot. Any automatic cut detection method can be used to provide this level of abstraction. Second, since no cut detection method offers 100\% accuracy rate, there will always be missed or misdetected shots. In order to provide the user a clue so as to avoid being affected by the imperfection of any cut detection method (or any automatic method in the matter) in the search of desired video clip, additional information should be provided that has the characteristics referred to above:

it must be completely different and independent from what the automatic cut detection algorithm extracts from the video it should be raw information, but should not be the original video it should be concise It is believed that the best choice is the cross-section image. A cross-section image is an image generated directly from the original video. The present implementation selects one in the horizontal and the other in the vertical direction of the video volume, although, in general, one can select any number of directions. The process of constructing a cross-section image is illustrated in FIG. 5. The horizontal (vertical) cross-section image is constructed by sampling the middle row (or the middle column) from every image and by collecting all samples over time (FIG. 5A). To provide a complete view of both cross-section images, they are combined into one image and then the image is segmented into two bands according to the list of detected shots (FIG. 5B).

Figures 6A, 6B:
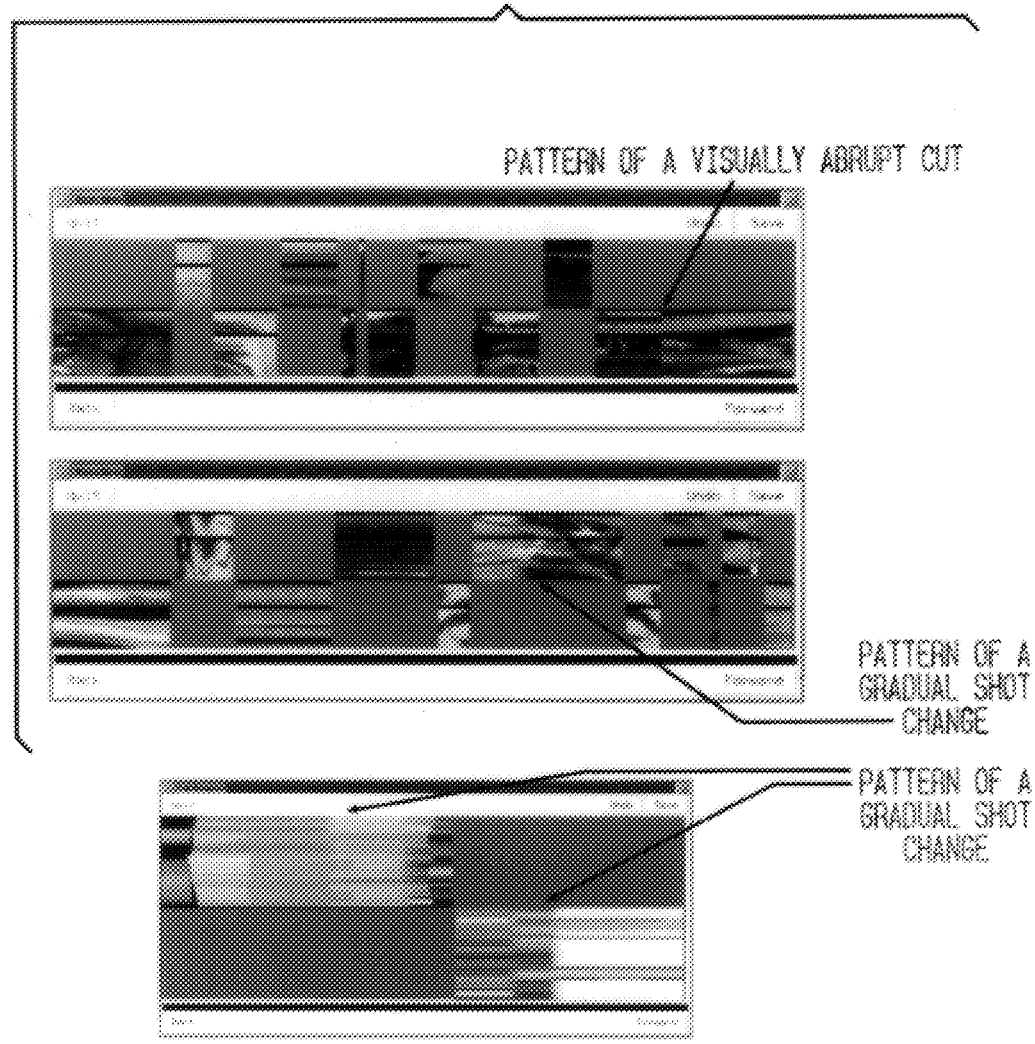
FIG. 6(a) shows visually abrupt cuts and FIG. 6(b) shows gradual shot transitions, in black and white.

This representation provides a level of abstraction which reveals the continuity of video frames. For example, if there is a missed shot which is the result of a visually abrupt cut or camera break, a clear discontinuous pattern is discernible as shown in FIG. 6(a). For cuts that are associated with gradual shot transitions such as dissolves, a blurred discontinuous pattern is apparent as shown in the bottom two pictures of FIG. 6(b).

Figure 4:
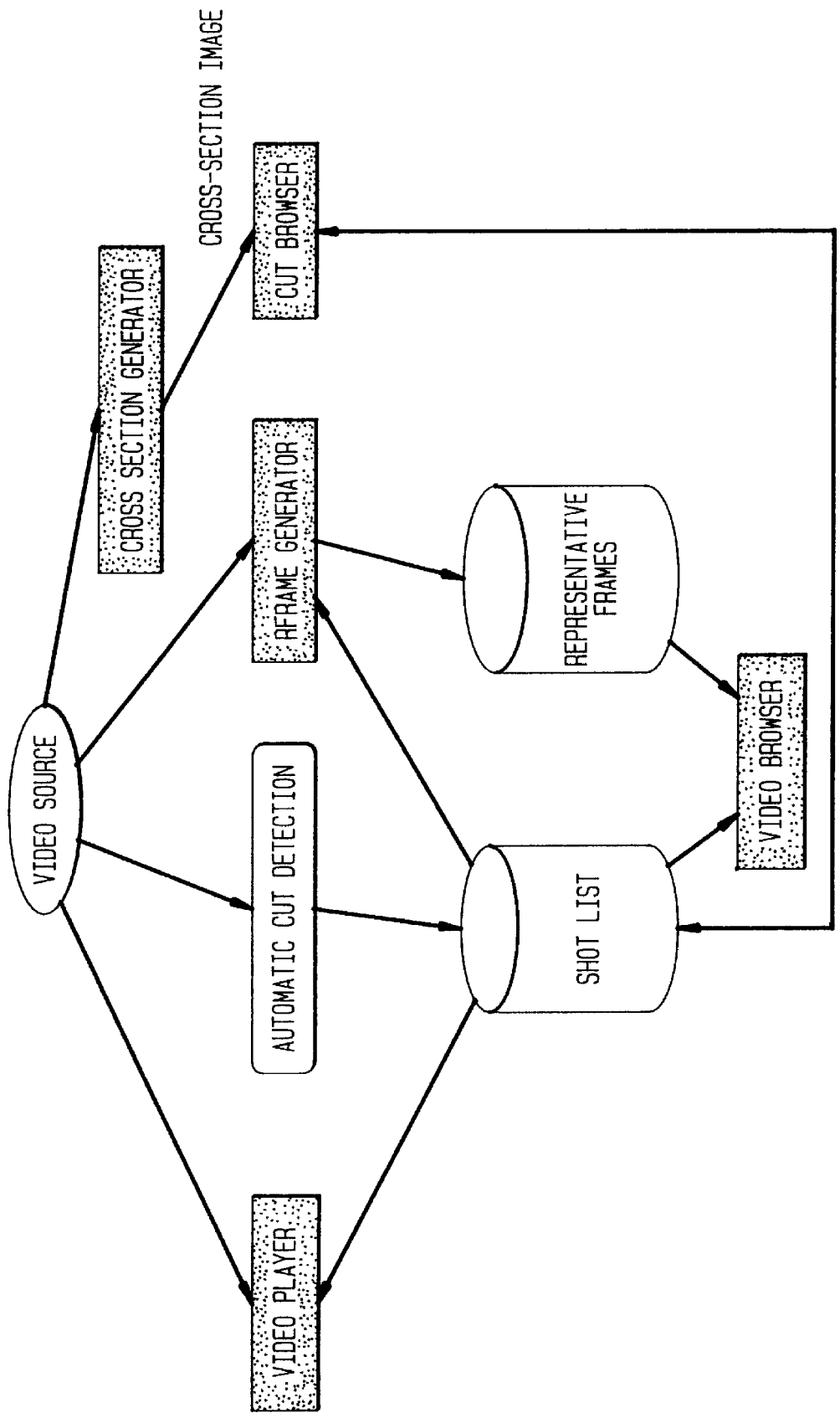
FIG. 4 shows browsing apparatus in accordance with the invention.

Five components are utilized herein: a video player, a video browser, a cut browser, a Rframe generator, and a cross-section generator. Their inter-relationship is shown in FIG. 4. In this figure, the video source can be either an analog or a compressed digital video and the automatic cut detection module can be any automatic cut detection method as long as it outputs a list of shots in frame numbers. The video player, the video browser, and the cut browser are three major components, which are supported by two other components, the Rframe generator and the cross-section generator. The activities in all components are completely synchronized.

The Rframe generator takes the shot list as well as the original video and produces thumbnail pictures that represent each shot. Whenever the shot list is updated, it updates the list of thumbnail pictures. The video player plays back the original video and accepts requests coming from either the video browser or the cut browser. The playback can start from any video frame. In order to locate the desired video frame, either the time code or the byte offset is used, depending on whether the video source is, an analog video or a digital compressed video respectively.

The video player also has a VCR-like user interface which implements functions such as pause, play, slow motion, fast forward, and rewind. It also provide a shot jump capability allowing the user to skip shots which are detected by the automatic cut detection method.

The video browser displays a list of thumbnail pictures representing each detected shot. It allows a user to quickly glance through a video to find the clip of interest. The desired one will be found if it is among the list of detected shots. The video browser will properly position itself by taking information from either the video player or the cut browser. When a video is being played or the cross-section image is clicked, the representative frame of the associated shot will be highlighted. When the cross-section image scrolls, the list of thumbnail pictures will scroll accordingly.

To provide information for missed or misdetected shots, the cut browser presents the cross-section image generated from the raw video. In the foregoing description, the types of patterns that could appear in the cross-section image when there is a shot change where described and explained. These patterns of cross-section images provide useful information for manual identification of missed or misdetected shots. When a user clicks on the cross-section image, the cut browser maps the mouse location to a frame number and sends the request to both the video player and the video browser. The video will start playing from that frame and the associated representative frame in the video browser will be highlighted.

The foregoing exemplary embodiment has been described in terms of two cross-section images; however, it is within the contemplation of the invention that a plurality of such images, which may be greater than two, can be utilized.

Figure 15:
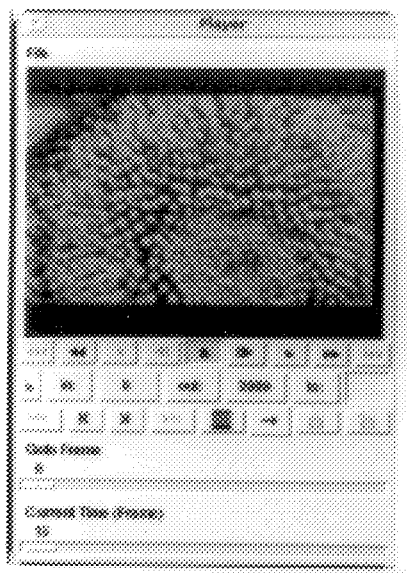
FIG. 15 shows cut browser apparatus incorporating the invention, 15(a) being in black and white and 15(b) being the same figure in color.
Figure 15:
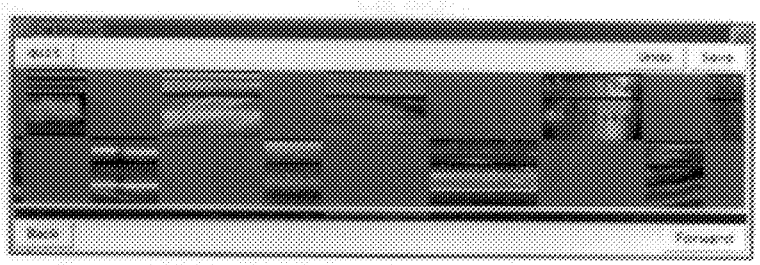
Figure 15:
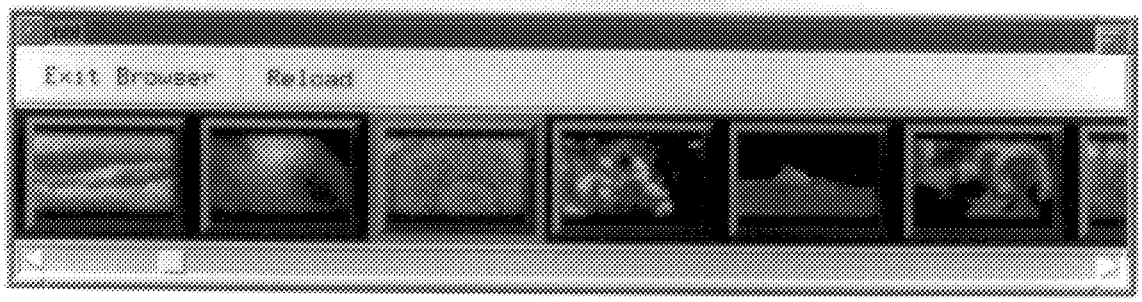

The user interface of the current invention is shown in FIG. 15. In operation, initially, three windows display on the screen. To search the content of the video, the user would examine each representative frame in the video browser to see whether it is the desired shot. When the list of thumbnail pictures is being scrolled, the content of the cut browser will be updated to match the representative frame that is being highlighted. The user would clearly see if there is any missed shot between the current and the next shot. When the user is in doubt, they can simply click on the point which might start a missed shot in the cut browser to look at the content in the raw video. To decide if the cut detection method may have missed or misdetected a shot, the user could simply examine the cross-section image in the cut browser. If the user sees any pattern that might represent a missed or a misdetected shot, the user would then click on the point in the cut browser to look at the content of the raw video.

The cut browser also provides the editing capability. This editing function is extremely useful for authoring content-indexed multimedia materials. It allows a user to break any shot into two, or merge any two shots into one, through a mouse or a button click. When this event happens, the cross-section image will be reorganized into two bands and the shot list is updated. The Rframe generator will then update the list of representative frames.

For example, when all video frames are in the same shot and all shots are correctly detected, a clear continuous pattern in this cross-section image is seen, as explained above in reference to the example shown in FIG. 6.

In addition, since these are also raw image data, no interpretation is presented and therefore no further error could be introduced.

Figure 7:
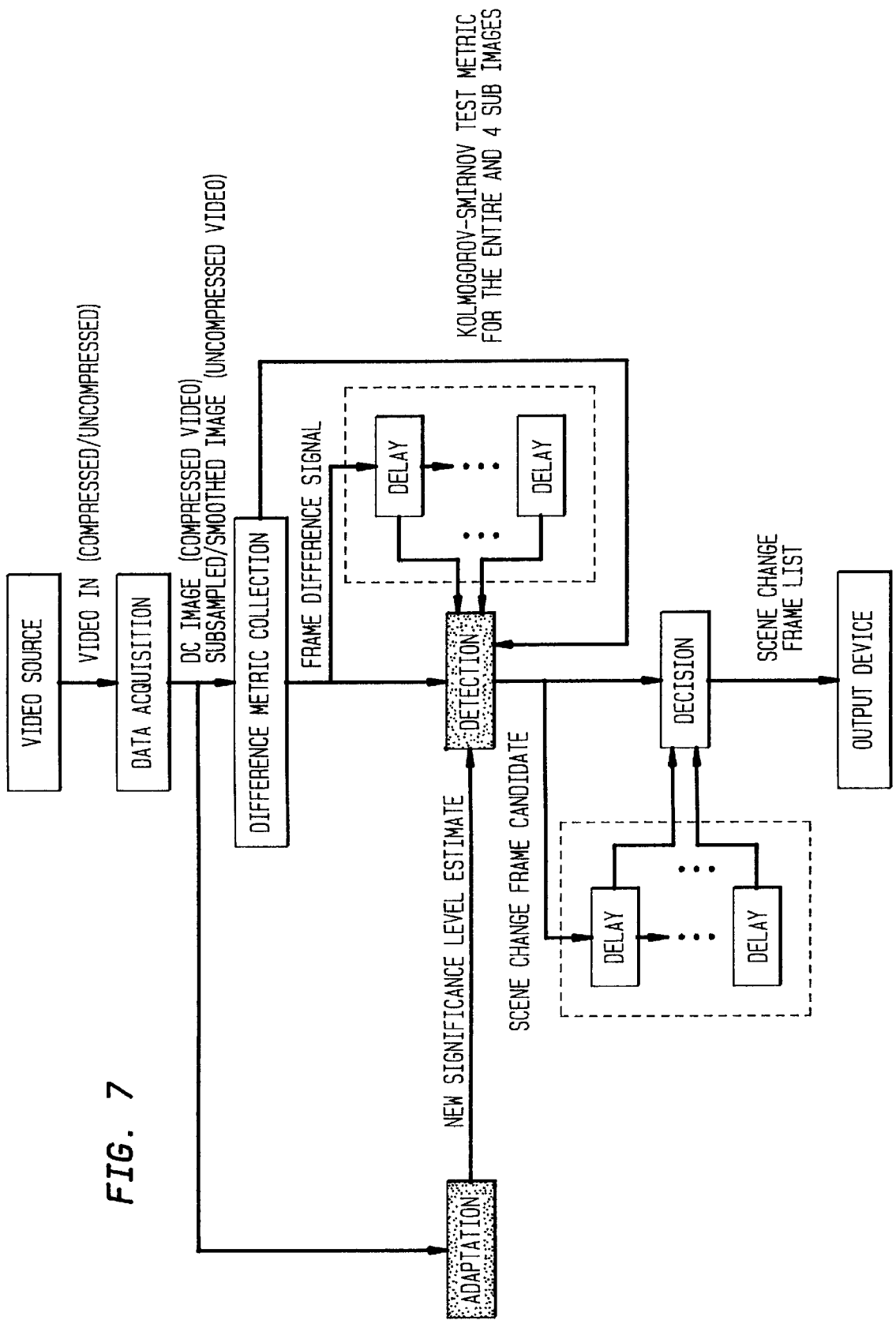
FIG. 7 shows a flow diagram of a cut detection algorithm in accordance with the invention.

The problem analysis described in the previous sections is incorporated in the present inventive solution to the cut detection problem which allows a partitioning of a video into a set of shots comprising visually abrupt cuts or camera breaks. FIG. 7 shows a flow diagram of a cut detection algorithm in accordance with the invention.

Unlike prior art methods which use either pixel-based or distribution-based difference metric, the present invention integrates both types of information in a new detection scheme. The invention includes an adaptive engine to provide the detection scheme with the ability to automatically adjust to different types of video contents. The result from the automatic cut detection is presented to the user through a cut browsing apparatus, where three tasks can be performed: to search the content of the video, to decide if the cut detection method may have missed or misdetected a shot, and to create or eliminate cuts.

The cut detection is herein formulated as a time series outlier detection problem. As shown in FIG. 7, the system can take either uncompressed or compressed continuous video as the input. Experimentally, MPEG-1 compressed video has been utilized and a sequence of DC images generated using the approach described in B.-L. Yeo and B. Liu, "On the Extraction of DC Sequence from MPEG Compressed Video," Proc. of ICIP, October 1995. Both the pixel-based and the distribution-based difference metric are then computed from these DC images (difference metric collection), while video contents are measured to provide up-to-date test criteria (adaptation). Information from both the distribution-based and pixel-based difference metric are fused (detection), after taking into account the new test criteria (significance level) provided by the adaptation step. Finally, a list of scene change frame candidates is produced and filtered, resulting in the final scene change frame list (decision).

DC images are reduced images formed from the collection of scaled DC coefficients in intra-coded DCT compressed video. Such images can be directly reconstructed from JPEG or movie-JPEG videos. For MPEG and H.261 videos, fast reconstruction of DC images from motion-compensated pictures requires some levels of approximation. The technique described in B.-L. Yeo and B. Liu, "On the Extraction of DC Sequence from MPEG Compressed Video," Proc. of ICIP, October 1995 is herein applied to generate DC luminance images from every single frame of MPEG video, while the chrominance components are simply discarded. Briefly, technique extracts the DC image corresponding to motion-compensated pictures directly from the compressed stream in the following manner. The technique first locates, for each block of interest, four original neighboring blocks from which the current block of interest is derived. It then approximate the DC term of each block of interest by the weighted sum of the DC's of the four original neighboring blocks, where the weights are simply the fraction of area occupied by the current block.

It is noted, however, that this technique is not necessary in the realization of the present invention. Alternatively, one can take uncompressed video frames and subsample them to create the same size of images to feed into the apparatus in accordance with the invention.

Figure 8:
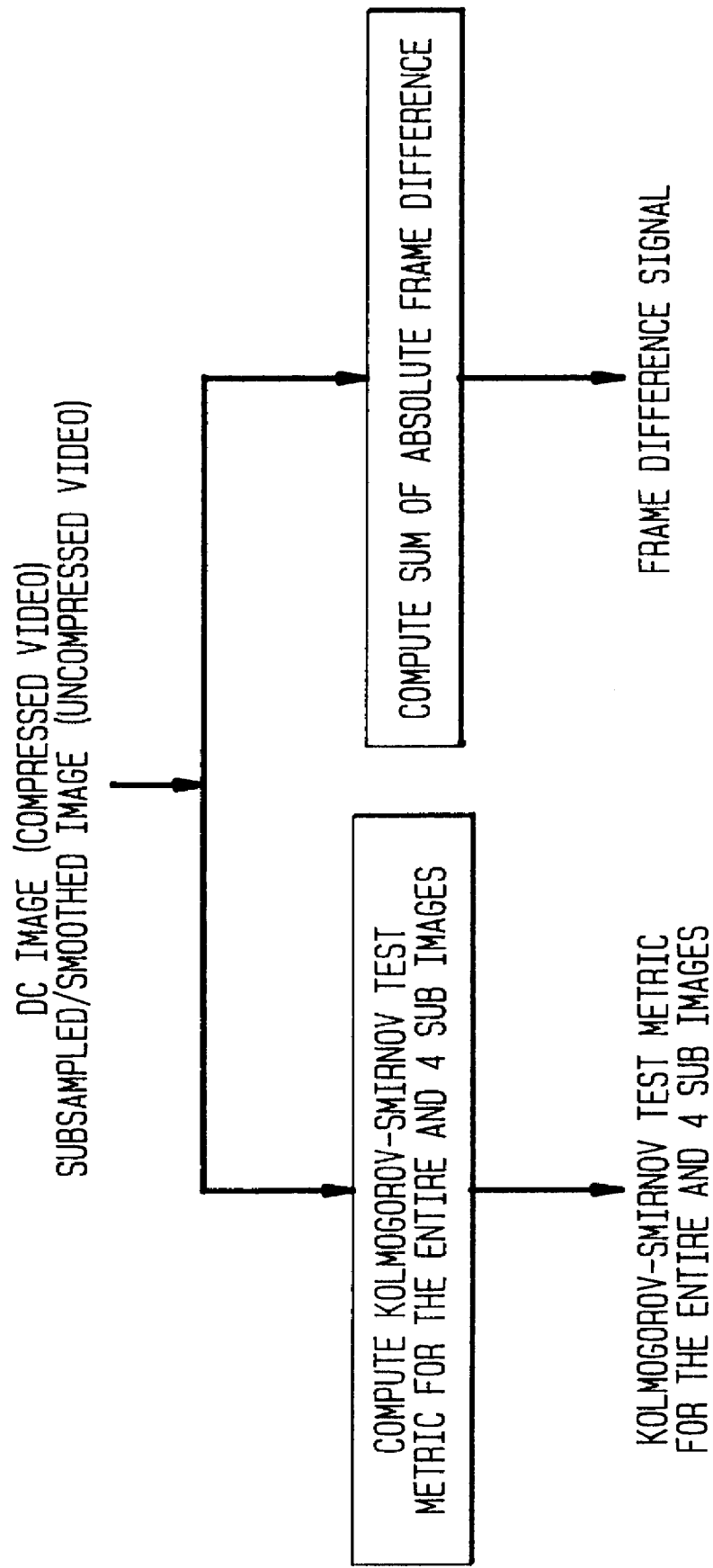
FIG. 8 shows a sub flow diagram of the difference metric collection step in accordance with the invention.

In this step, both pixel-based and distribution-based difference metrics are collected as shown in FIG. 8, which shows the sub-diagram of the difference metric collection step. In accordance with the invention, the pixel-based difference metric for each frame t is the sum of absolute frame difference, $$\sum_{ij} |f^t_{ij} - f^{t-1}_{ij}|$$

where $f^t_{ij}$ represents the intensity value at pixel location (i, j) in frame t t.

The distribution-based difference metric is the traditional Kolmogorov-Smirnov test metric, except that one each is computed herein for the entire image as well as its four equally divided sub-regions.

Figure 9:
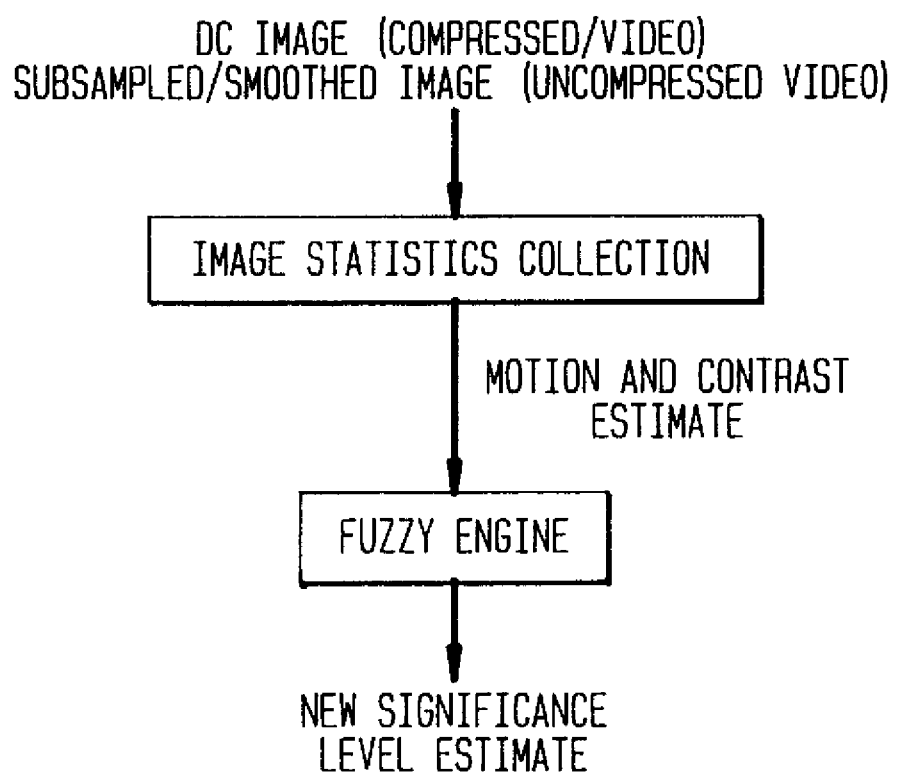
FIG. 9 shows a sub flow diagram of the adaptation step in accordance with the invention.

The purpose of this step is to provide the detection scheme with the ability to automatically adjust to different video contents. FIG. 9 shows the sub-diagram of the adaptation step. As shown in FIG. 9, statistics from each DC image and each pair of DC images are first collected to represent the current video content. They are the image contrast and the motion estimate. The image contrast estimate is computed based on a recursive scheme to suppress the influences of sudden lighting changes.

$$contrast_t = (1-\tau)contrast_{t-1} + \tau \sigma_{t-1}$$

where sigma__{t-1} $\sigma_{t-1}$ is the intensity variance estimate of the DC image at time t−1 and τ equals 0.6 in the present exemplary embodiment.

Similarly, the motion estimate is computed as follows $$motion_t = (1-\tau)motion_{t-1} + \tau \sum_{ij} \left( \frac{|f^{t-1}_{ij} - f^{t-2}_{ij}|}{N} \right)$$

where $f^{t-1}_{ij}$ is the intensity value at pixel location (i, j) of the DC image at time t−1, N is the size of the image, and τ equals 0.6 in the present exemplary embodiment.

Figure 10:
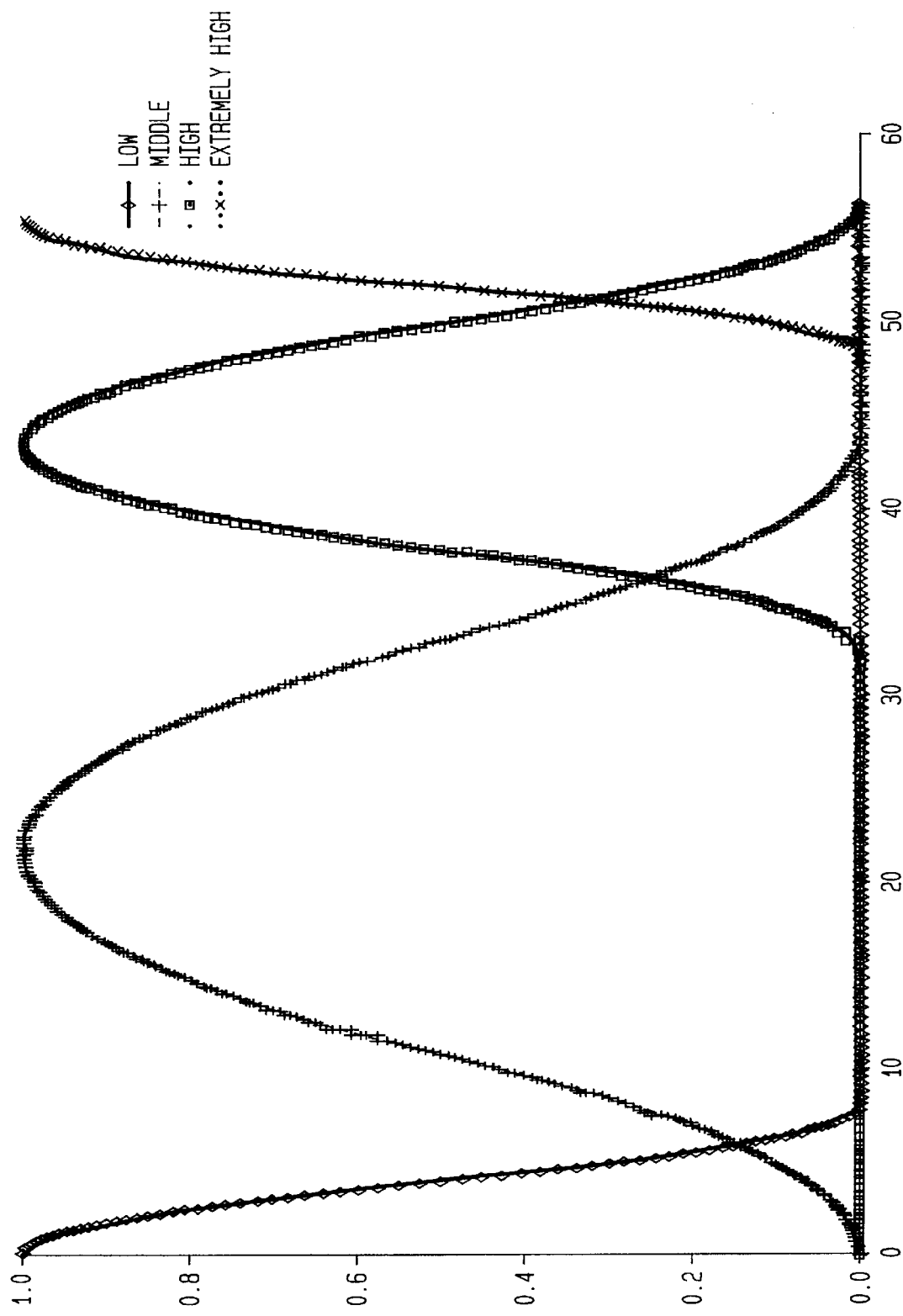
FIG. 10 shows the membership function of contrast estimate in accordance with the invention.
Figure 11:
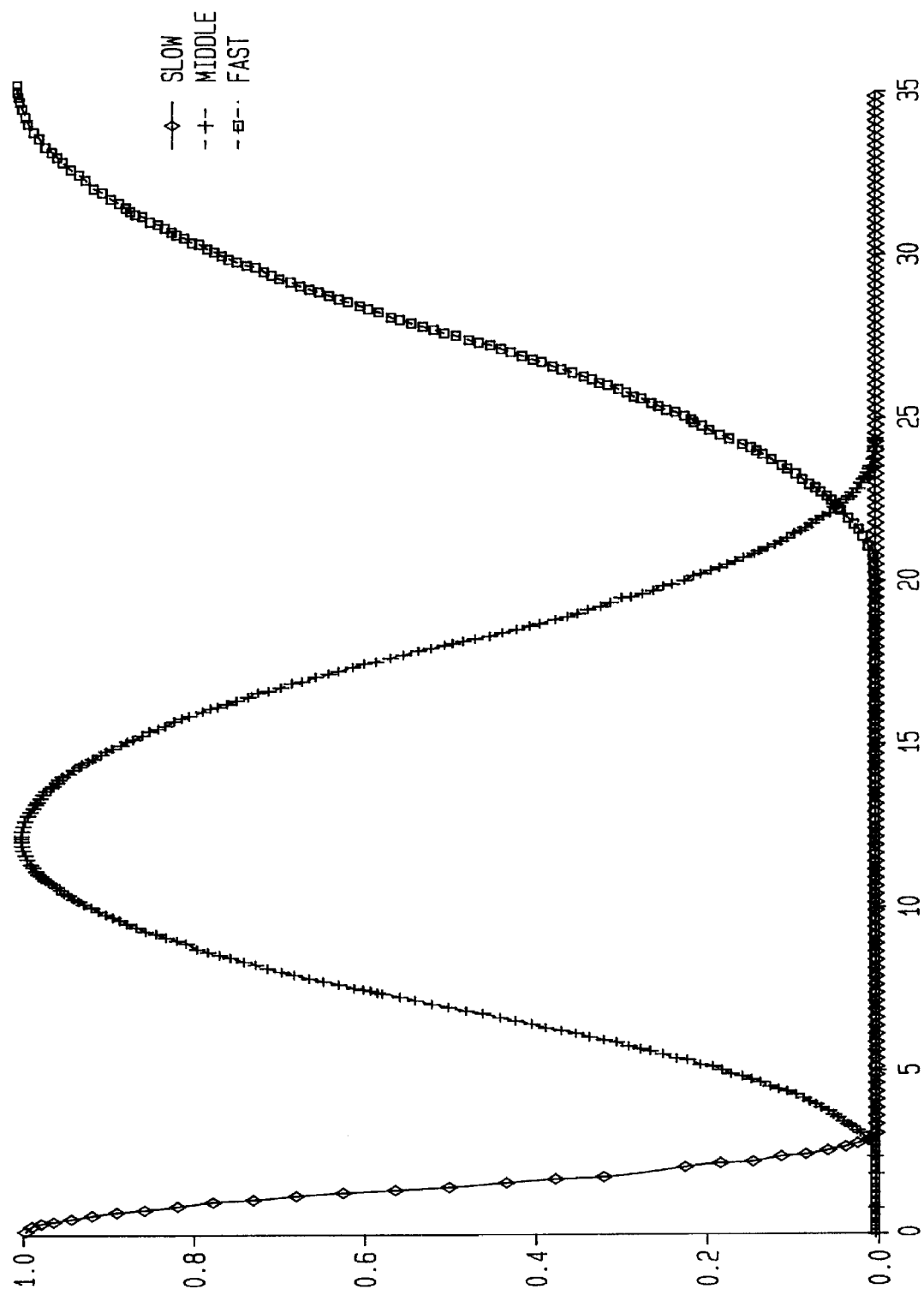
FIG. 11 shows the membership function of motion estimate in accordance with the invention.
Figure 12:
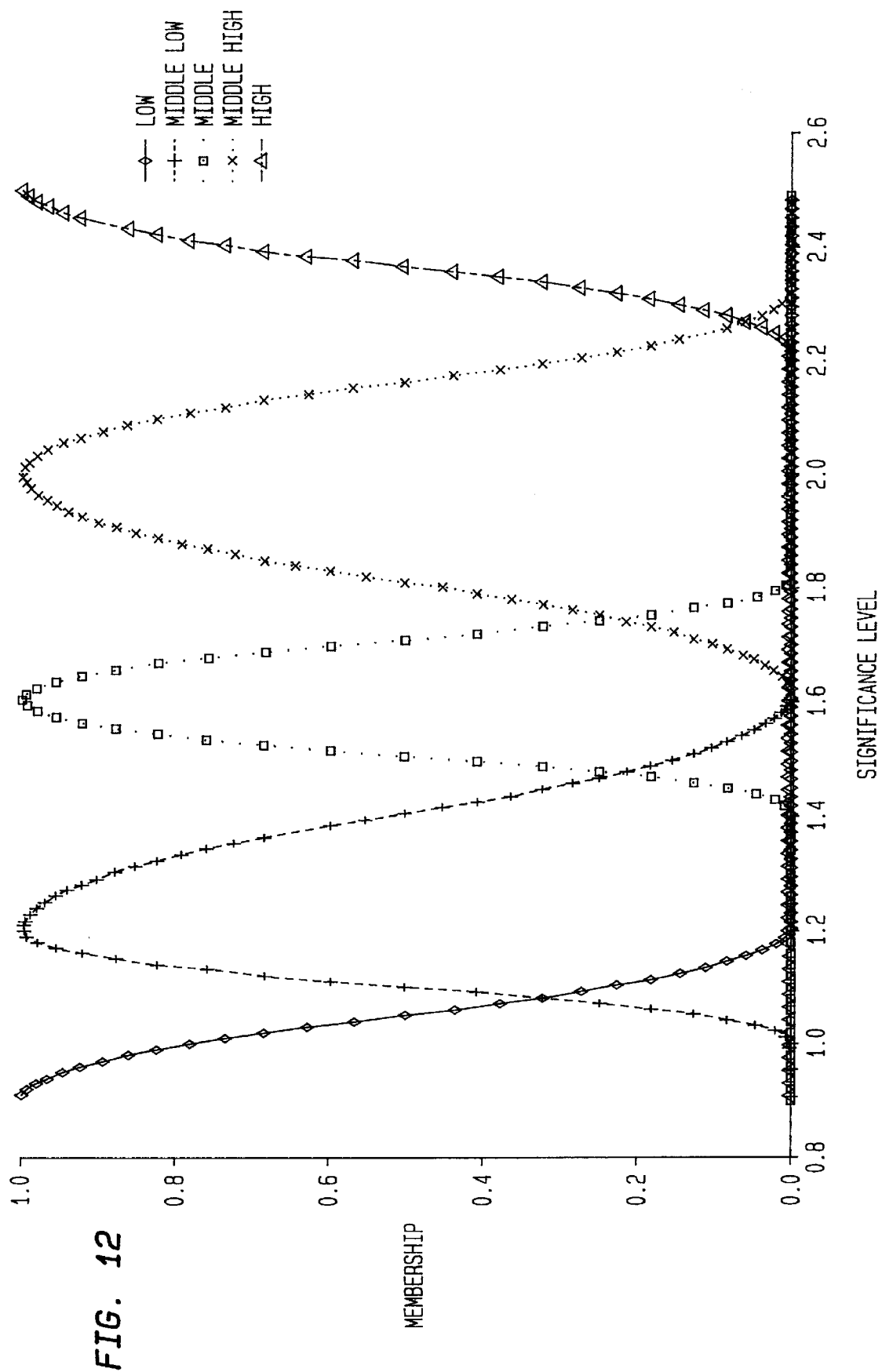
FIG. 12 shows the membership function of $K_\alpha$ which is proportional to significance level in accordance with the invention.

Both the image contrast and the motion estimates are then taken into a fuzzy engine to compute a new significance level for the hierarchical Kolmogorov-Smirnov test. The fuzzy engine uses a quadratic membership function, where each contrast measurement is divided into four classes (low, middle, high, and extremely high), each motion estimate into three classes (slow, middle, and fast), and each significance level ($K_\alpha$) into five classes (high, middle high, middle, middle low, and low), as shown in FIGS. 10, 11 and 12 illustrating the membership functions of the fuzzy engine in accordance with the invention. FIGS. 10, 11, and 12 show the membership functions of contrast estimate, motion estimate, and $K_\alpha$ which is proportional to significance level, respectively.

Based on definitions of membership functions, the fuzzy rules are stated in a simple IF/THEN format, where values are combined using AND (minimum) or OR (maximum) operations. All rules are listed in the following Table 1.

TABLE 1

IF contrast is low and motion is slow, THEN significance level is middle
IF contrast is middle and motion is slow THEN significance level is middle low
IF contrast is high and motion is slow THEN significance level is middle low
IF contrast is extremely high and motion is slow THEN significance level is low
IF contrast is low and motion is fast THEN significance level is high
IF contrast is middle and motion is fast THEN significance level is middle high
IF contrast is high and motion is fast THEN significance level is middle
IF contrast is extremely high and motion is fast THEN significance level is middle low
IF contrast is low and motion is middle THEN significance level is high
IF contrast is middle and motion is middle THEN significance level is middle high
IF contrast is high and motion is middle THEN significance level is middle high
IF contrast is extremely high and motion is middle THEN significance level is middle Since all rules have given different values for the significance level, they must be resolved or defuzzified to yield a crisp final output value. Here, the centroid method of Zadeh et al. is used to find the center of gravity of the combined output shape, ensuring all rules contributing to the final crisp result. For the centroid method, see L. A. Zadeh and J. Kacprzyk, Fuzzy Logic for the Management of Uncertainty, John Wiley & Sons, Inc., 1992. It is noted that, although the above fuzzy membership functions and rules serve the purpose of the invention, these membership functions nor fuzzy rules have not been optimized.

Figure 13:
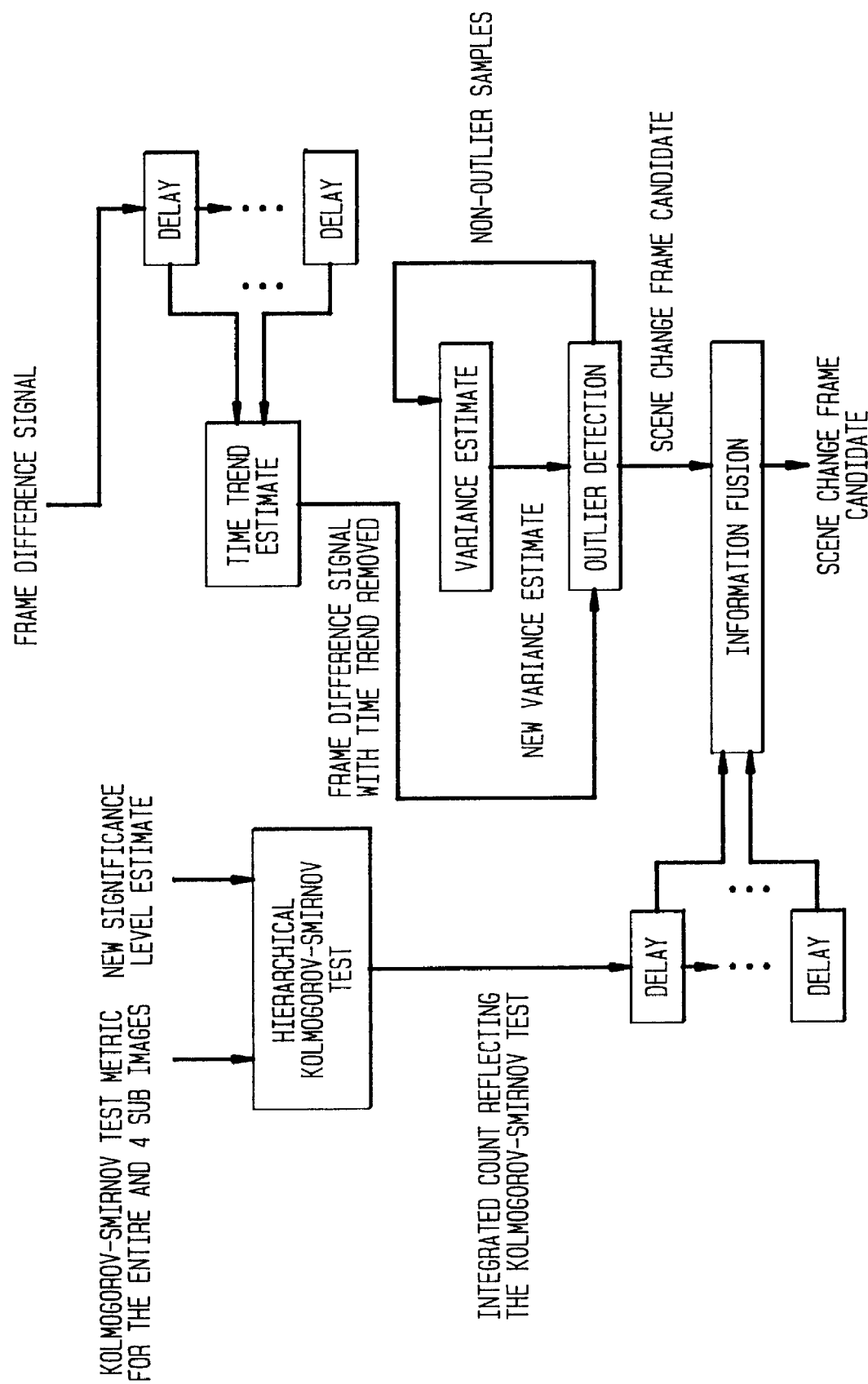
FIG. 13 shows a sub flow diagram of the detection step in accordance with the invention.

In this detection step, shown in the sub-diagram of FIG. 13, both pixel-based and distribution-based difference metrics are independently tested and the results are fused to output scene change frame candidates. Pixel-based difference metrics are treated as time series signals, where both visually abrupt cuts and the duplication of frames create observation outliers obeying Equation (8).

In time trend estimation, a piecewise linear function is used to model the trend, as opposed to a more sophisticated model. Robust statistics also utilized to avoid the influence of type II observation outliers in trend estimation (see the definitions previously presented). The difference metrics associated with frames from three frames before until three frames after the current frame are sorted. Assume they are ordered, $\hat{d}_1 < \ldots \hat{d}_7$. $\hat{d}_5$ and $\hat{d}_6$ are used to fit a line. The interpolated/extrapolated value at the current frame is the predicted value from the trend analysis.

Figure 14A:
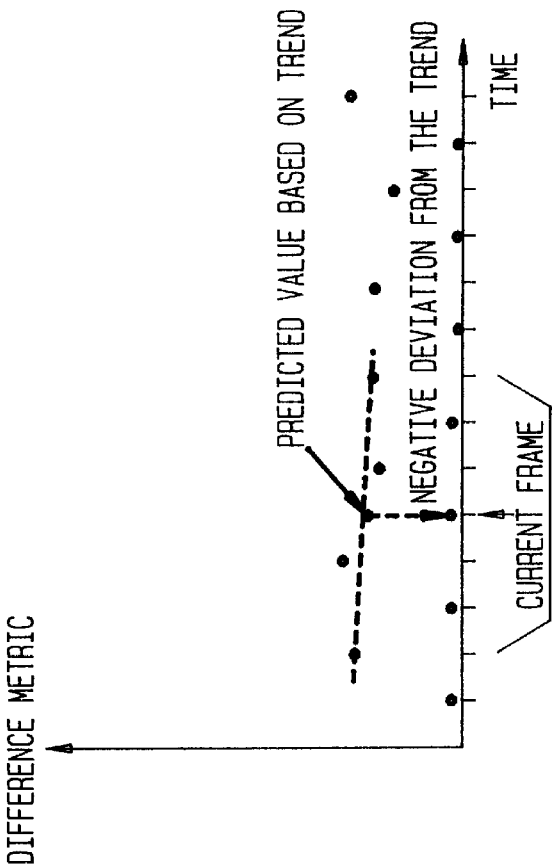
FIG. 14(a) shows that a type I observation outlier is detected and FIG. 14(b) shows that a type II observation outlier is detected.
Figure 14B:
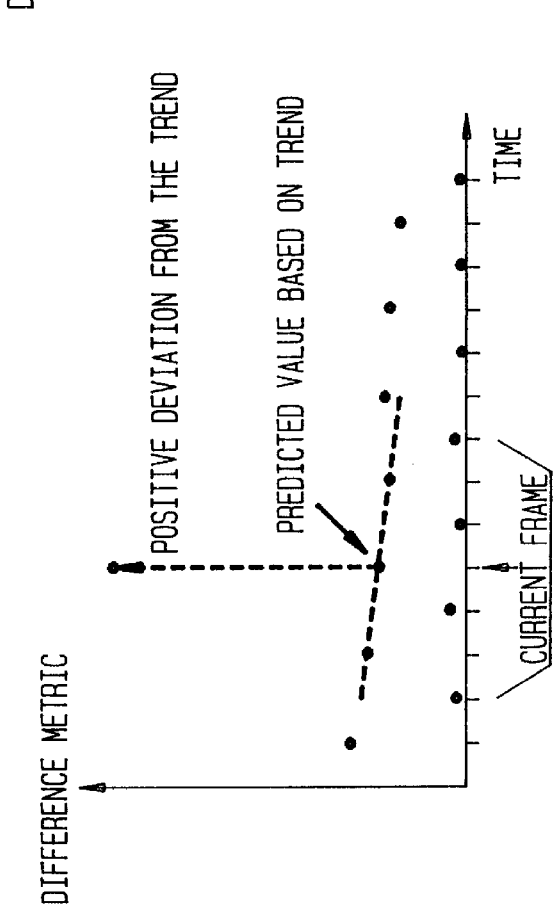

This process is shown in FIG. 14, which shows an example of trend estimation (left) where a type I observation outlier is detected. Note that type II observation outliers exist in every other frame, wherein are plotted two sets of pixel-based difference metric (for example, sum of absolute difference against time. In both examples, frame 5 is the current frame, which is associated with a visually abrupt cut and a duplicated frame in the first and the second example respectively.

First, samples are collected from frame 2 to frame 8 and sorted out in ascending order. Four smallest values (samples from frame 2, 4, 6, 8 and from frame 3, 5, 6, 7 in the first and the second example respectively) are then discarded. This is because in any 7 frame interval the most type II observation outliers that one could have are four. In addition, the biggest value is also discarded (sample from frame 5 and from frame 4 in the first and the second example) because it may correspond to the visually abrupt cut as illustrated in FIG. 14.

Finally, samples from frame 3, 7 (in the first example), and from frame 2, 8 (in the second example) are chosen to fit a straight line. In the first example, the interpolated value at the current frame is much smaller than the actual value (positive deviation from the trend), whereas the interpolated value is much bigger than the actual value (negative deviation from the trend) in the second case. The former will be defined as type I observation outlier in the context of cut detection and the latter, type II observation outlier.

After the time trend is estimated, it is subtracted from the observed time series and then test the hypothesis, $H_0: \Delta = 0$, against the alternative, $H_1: \Delta \neq 0$ in Equation (8). A practical solution is obtained by considering a simple criterion of the form $$\lambda_q = \frac{\tilde{\Delta}}{\hat{\sigma}_{\tilde{\Delta}}}$$

where $\tilde{\Delta}$ is the estimate of the displacement in the qth observation and $\hat{\sigma}_{\tilde{\Delta}}$ is the estimate of the variance of $\tilde{\Delta}$. $\hat{\sigma}_{\tilde{\Delta}}$ can be estimated by spectral methods (see U. Grenander and M. Rosenblatt, Statistical Analysis of Stationary Time Series, New York: Wiley, 1966, or, in accordance with the present exemplary embodiment of the invention, by substituting usual estimates of $\sigma_z$ and $\alpha_r (r=1,2,\ldots,p)$ into $$\hat{\sigma}_{\tilde{\Delta}} = \frac{\sigma_z^2}{1 + \alpha_1^2 + \ldots + \alpha_p^2}$$

Note that $\alpha_r (r=1,2,\ldots,p)$ and $\sigma_z$ are the same as in Equation (9). For performance reasons in the present exemplary embodiment of the invention, a zeroth th-order autoregressive model is assumed, and therefore, $\alpha_r = 0$ $(r=1,2,\ldots,p)$.

Finally, for all samples that are identified as observation outliers, if the predicted value from the trend is less than the observed, the frame is marked as a possible shot change frame candidate.

Variance Estimate

For those observed samples which are neither type I nor type II observation outliers, they are utilized to update the variance estimate $\sigma_z$ using the following formula:

$$\sigma_z = (1-\tau)\sigma_z + \tau(\text{frame difference signal with trend removed})$$

where $\tau$ equals 0.6.

As described in previous sections, the Kolmogorov-Smirnov test is concerned with the agreement of two sets of observed values. The null hypothesis is that two samples come from populations with the same distribution function F(x) F(x). It can be shown that $$\text{Prob}\left(d_t > K_\alpha \sqrt{\frac{2}{N}}\right) = \alpha$$

where $K_\alpha$ represents a constant depending on the level of significance $\alpha$ and is available in tabular form from most statistics books. See, for example, J. D. Gibbons and S. Chakraborti, Nonparametric Statistical Inference, Marcel Dekker, Inc., 1992. N is the size of the image the statistic is collected upon. $d_t$, defined to be $$max_j|EDF_t(j)-EDF_{t-1}(j)|,$$

is constructed directly from the histogram of each DC image (see Equation (4)).

In each frame, a new significance level $\alpha$ is acquired from the adaptation step. $\alpha$ is used in the test involved not only the entire image but also each of its four equally divided sub images. Assume that n out of 4 regions show changes. The integrated count is defined as follows.

$KS_t=n*2+1$ if the statistics based on the entire image shows a change}

$KS_t=n*2$ otherwise} (12)

This integrated count weights the change detected from any one of 4 regions twice more than the change detected from the entire image.

In this stage, the integrated count produced by the Hierarchical Kolmogorov-Smirnov test is used to eliminate false positives produced by the time series outlier detection process. Denote the integrated count produced for frame t by $\Phi_t$. The system eliminates a scene change frame candidate if When the system reaches this step, most false positives will have been eliminated. However, there could still be some due to flash light or extremely fast camera motion. A criterion can be set up to eliminate such false positives. The list of detected cut frames is stored in a delay memory as shown by the dashed box attached to the decision step in FIG. 7 and examine the distance between any two cuts. Any cut that occurs in a distance less than a preset value (in the present exemplary embodiment, five frames) will be eliminated.

The proposed cut browsing apparatus contains three basic elements: the Video Player, the Video Browser, and the Cut Browser. These three elements provide video browsing at three different levels of abstraction. The video player and the cut browser both present only raw video material, although in the latter case, the presented materials are at a different level of abstraction. However, the video browser presents interpreted information about shots in the video. Together, these three components offer the best tool to any user who would like to perform the following three tasks: to search the content of the video, to decide if the cut detection method may have missed or misdetected a shot, and to create or eliminate cuts.

The proposed cut browsing apparatus works as follows. When it is started, three windows display on the screen as shown in FIG. 15, which shows the cut browsing apparatus.

The video browser shows all detected shots using representative frames (Rframes), while the cut browser displays the cross section image made from the entire video. The activities in all three windows are completely synchronized. For example, if the user use the mouse to click on any point in the cut browser, the associated representative frame in the video browser will be highlighted and the video player will start playing back the video from the same point. Whenever the video browser gets scrolled, the cross-section image scrolls accordingly.

To carry out the first function, namely to search the content of the video, the user would examine each representative frame in the video browser to see whether it is the desired shot. For every shot, the user would also examine the corresponding cross-section image in the cut browser to see if there is any pattern of missed shots. When any point is in doubt, the user would click on the point in the cut browser to look at the raw video playback in the video player.

To decide if the cut detection method may have missed or misdetected a shot, the user could simply examine the cross-section image in the cut browser. If there is any pattern of missed or misdetected shots, the user would then click on the point in the cut browser to look at the raw video playback in the video player.

The cut browser also provides the editing capability. A user can break any shot into two or merge any two shots into one through a mouse or a button click. When this event happens, the cross-section image will be segmented differently and the list of representative frames will get updated as well.

The cut detection algorithm in accordance with the invention was applied to 24 video clips which included more than 149,000 MPEG-1 PAL and NTSC video frames. These videos come in a variety of types including movie trailers, cartoons, and sports videos, as listed in Table 2, following. Table 2 also shows the number of abrupt cuts ($N_c$), the number of missed cuts (N__{m}) ($N_m$), and the number of false detected cuts ($N_f$). These are experimental results from the automatic cut detection method in accordance with the invention. For those shots that are missed or misdetected, they all show clear patterns in cross-section images and therefore are easily identified manually using the present cut browsing apparatus.

The present invention is believed to provide a recall and precision rate in the order of 99% and can detect from reading the video to the output of shot, change frames, close or near the video rate. The cut browsing apparatus has a cut browsing apparatus capable of substantially achieving 100% recall rate. The invention takes into account the nonstationary nature of the cut detection problem, and has been tested on a variety of videos and over 149,000 video frames.

Clearly, the present invention can be implemented in conjunction with the use of a suitably programmed digital computer, using programming techniques known in the art.

While the present invention has been described by way of exemplary embodiments, these are not intended to be limiting and various changes and modifications will be apparent to those skilled in the art to which it pertains. For example, various details can be rearranged in the screens of the browsers without departing from the spirit of the invention. Furthermore, various alternative slicing planes for deriving cross section images can be substituted in a manner consistent with the invention. These and like changes are intended to be within the scope and contemplation of the invention which is defined by the claims following.

APPENDIX

REPRESENTING CONTENTS OF SINGLE VIDEO SHOT USING RFRAMES

The present invention relates to the task of detecting scene changes to form video shots in encoded video sequences and the representation of video shots. More particularly, the invention also relates to systems incorporating encoded video, wherein the ability to manage video data and display information efficiently is of particular importance and to low level management techniques for digital video.

For systems incorporating encoded video, such as video editing systems, various multimedia authoring systems, video-based training systems, and video on demand systems, the ability to manage video data and display information efficiently is critical. While known systems may incorporate other types of media as well, management of video is particularly difficult because of the vast volume of data associated with it and the high data rates involved, typically, many megabytes of data per minute. Prior steps taken towards the solution of video management problems have either relied on labor intensive techniques, such as manually entering keywords to describe the video contents, or on simple image processing techniques, such as analyzing histograms. These approaches have drawbacks and are neither close to providing ideal solutions, nor are they efficient in their tasks. Keywords have many drawbacks, such as, typically, an inadequate choice of terms for use at search time, the variable context in which the words are used, and the influence of the individual operator. See, for example, S-K. Chang and A. Hsu, Image information systems: Where do we go from here? IEEE Transactions on Knowledge and Data Engineering, 4(5):431-442, October 1992.

Furthermore, image processing steps cannot be efficiently applied to the hundreds of thousands of images that are usually associated with video. This paper presents techniques aimed at the management of encoded video, such as MPEG (D. Le Gall. MPEG: A video compression standard for multimedia applications, Communications of ACM, 34(4):46-58, April 1991.), JPEG (G.K. Wallace. The JPEG still picture compression standard, Communications of ACM, 34(4):30-44, April 1991.), and H.261 (M. Liou. Overview of the 64 kbits/s video coding standard, Communications of ACM, 34(4):59-63, April 1991.) which overcome the limitations of traditional image processing steps while enhancing keyword based approaches currently in wide use.

Sub-tasks of video management include the ability to quickly locate a particular video sequence — herein referred to as high level video management — and the ability to view particular points of interest within the video sequence — herein referred to as low level video management. The need for management of video exists in many domains, from TV news organizations where these capabilities are critical, to home video libraries where such capabilities can be very useful.

The present invention is concerned more particularly with low level management techniques for digital video. Currently, a widely used search technique, applicable, for example, to a tape recording machine, is to fast-forward and rewind to arrive at the point of interest. This technique is slow and inefficient. More recently, image processing techniques have been developed to operate on digital video in order to facilitate this task. A first step in solving this problem is to "divide" the video sequence into meaningful segments much like text in a book can be divided up into sentences. In video, a logical point to partition the video sequence is where the contents of video "change" in some way from one frame to the next — referred to as a scene change.

The past research work involving low level video management has concentrated on the parsing of video sequences into video clips. In most cases, the logical parsing point is a change in the camera view point or a change in the scene. Usually, the histogram of each scene is generated and a large change in the histogram from one scene to the next is used as a cutting point [11]. Ueda et.al suggest the use of the rate of change of the histogram instead of the absolute change to increase the reliability of the cut separation mechanism. H. Ueda, T. Miyatake, S. Sumino and A. Nagasaka, Automatic Structure Visualization for Video Editing, in InterCHI'93 Conference Proceedings, Amsterdam, The Netherlands, 24-29 April, 1993, pp. 137-141. Ueda et. al also consider the zooming and the panning of the camera; each video frame is divided into a number of non-overlapping small regions and in each region the optical flow of pixels belonging to that region is approximated and classified into zooming and panning of camera. This information is then stored along with each cut. Nagasaka and Tanaka studied various measures to detect the scene changes. A. Nagasaka and Y. Tanaka, Automatic video indexing and full-video search for object appearances. In E. Knuth and L. M. Wegner, editors, Proceedings of the IFIP TC2/WG2.6 Second Working Conference on Visual Database Systems, pages 113-127. North-Holland, Sept. 30 - Oct. 3 1991. The best measure according to their studies is a normalized c2 test to compare the distance between two histograms. Additionally, to minimize the effects of camera flashes and certain other noises, the frames are each divided into several subframes. Then, rather than comparing pairs of frames, every pair of subframes between the two frames are compared, the largest differences are discarded, and the decision is based upon the differences of the remaining subframes.

The use of DCT coefficients prior to decompression has been attempted previously in other applications. Hsu et. al use DCT compressed images in a military target classification system to discriminate between man-made and natural objects. Y. Hsu, S. Prum, J. H. Kagel, and H. C. Andrews, Pattern recognition experiments in mandala/cosine domain, IEEE Transactions on Pattern Analysis and Machine Intelligence, 5(5):512-520, September 1983. The Bhattacharyya distance discriminator is used to measure and rank numerous statistical calculations derived from the DCT coefficients; and it is in turn used in the decision making process. Smith and Rowe extended many properties of the cosine/Fourier transform to used the DCT coefficients to perform several algebraic operations on a pair of images. B.C. Smith and L.A. Rowe, Algorithms for manipulating compressed images. To appear in IEEE Computer Graphics and Applications, 13(5), September 1993. Scalar addition, scalar multiplication, pixel-wise addition, and pixel-wise multiplication operations on two images were defined using the DCT coefficients; these operations are used in video editing systems to perform such tasks as dissolving and subtitling.

Tonomura et. al introduced several approaches to view the contents of videoshots: variable speed, sampling flash, rush, and time-space browser. Y. Tonomura, A. Akutsu, K. Otsuji and T. Sadakata, VideoMAP and VideoSpaceIcon: Tools for Anatomizing Video Content, in InterCHI'93 Conference Proceedings, Amsterdam, The Netherlands, 24-29 April, 1993, pp. 131-136. Tonomura, Y. and Abe, S., Content Oriented Visual Interface Using Video Icons for Visual Database Systems, in Journal of Visual Languages and Computing, Vol. 1, 1990, pp. 183-198. The variable speed browser, is very similar to VCR's jog and shuttle functions; the sampling flash browser is a series of icons formed from the first frame of each video shot without any clues to the contents; in the rushbrowser, instead of using video shots the sequence is divided along equally spaced time intervals;and the time-space browser displays a temporal sequence on several icons. In Y. Tonomura, A. Akutsu, K. Otsuji and T. Sadakata, VideoMAP and VideoSpaceIcon: Tools for Anatomizing Video Content, in InterCHI'93 Conference Proceedings, Amsterdam, The Netherlands, 24-29 April, 1993, pp. 131-136, much emphasis is placed on characterizing the contents of video shots with respect to camera and object motions.

Similar to Tonomura, Elliot introduced a browser which stacks every frame of the sequence. This approach suffers from several shortcomings: First, the stack is built as the user is watching the sequence. E. Elliott, Watch, Grab, Arrange, See: Thinking With Motion Images via Streams and Collages, Ph.D. Thesis, MIT, February 1993. This is not useful for video browsing because the user is "forced" to watch the video sequence because the stack can make sense only once the video has been seen. The second shortcoming is that the stack holds only about 20 seconds of video; this amount of video is not practical for use in actual cases. Third, once the stack is built, the user may "stroke" the stack to watch the contents. This is a minor improvement, from the user's point of view, over FF/REW. This approach fails to provide the user with a basic browsing unit, and it is more appropriate for video editing than for browsing.

Zhang et. al used the video shot as their basic browsing unit. H-J. Zhang and W. Smoliar, Developing Power Tools for Video Indexing and Retrieval, in Proceedings of SPIE Conference on Storage and Retrieval for Image and Video Databases, San Jose, CA, 1994. Similar to Tonomura, the frames of the shot are stacked to relay motion information and duration of the shot, and a frame from a shot may be "picked up" by placing the mouse along the side of the icon. In another mode, rather than stacking the frames, the icon thickness is used to convey shot duration; this is a wasteful use of screen space since the importance of the information does not justify the amount of screen space that is used.

Mills et. al introduced a browser for quick time video sequences. M. Mills, J. Cohen and Y-Y. Wong, A Magnifier Tool for Video Data, in Proceedings of ACM Computer Human Interface (CHI), May 3-7, 1992. Similar to Tonomura's rush browser, this browser does not take into consideration the contents of the video and rather systematically divides the sequence into several equal segments. Once the user has chosen a segment it in turn is divided into equal lengths and so on until the user can view each frame. In each case, the segment is represented using its first frame. This approach is a minor improvement to FF/REW and fails to provide the user with a sense of the contents of the video. The user could easily miss the information he or she is interested in because the representation of each segment has no relation to the reminder of the frames in that segment.

Disadvantages found in the foregoing above work are that either no basic browsing unit is used and/or that each frame of the video is needed by the user during the browsing operations, making it unsuitable for use over the network. Additionally, none of the above systems address the problem of icon management. This is very important since as many as several thousand icons could be needed to represent the shots for each two hour video sequence. Ueda et. al do address this issue by using color information. H. Ueda, T. Miyatake, S. Sumino and A. Nagasaka, Automatic Structure Visualization for Video Editing, in InterCHI'93 Conference Proceedings, Amsterdam, The Netherlands, 24-29 April, 1993, pp. 137-141. Color, however, cannot be the sole means of representation because color histograms are a many to one mapping functions. In our video browser, shape, as well as color information is used to help the user manage icons and navigate throughout a given video sequence.

In accordance with an aspect of the invention, a computer implemented method for providing a representative frame (Rframe) for a group of frames in a video sequence comprises (a) selecting a reference frame from the group of frames; (b) storing the reference frame in a computer memory; (c) defining a peripheral motion tracking region along an edge of the reference frame; and (d) successively tracking movement of boundary pixels in the tracking region.

In accordance with another aspect of the invention, in step (d) movement of boundary pixels is tracked successively from frame to frame in the group of frames.

In accordance with another aspect of the invention, (d) results in a track representative of camera or global motion.

In accordance with another aspect of the invention, step (d) results in a track indicative of a missed frame in the group of frames.

In accordance with another aspect of the invention, a computer implemented method for providing a representative frame (Rframe) for a group of frames in a video sequence, the group of frames consituting a shot, being frames between consecutive scene changes, comprises (a) selecting a reference frame from the shot; (b) storing the reference frame in a computer memory; (c) defining a peripheral motion tracking region along an edge of the reference frame, the tracking region being narrow relative to dimensions of the frame; and (d) successively tracking movement of boundary pixels in the tracking region such that a tracked position for each boundary pixel following a previous pixel occupies a position juxtaposed to a tracked position for the previous pixel.

In accordance with yet another aspect of the invention, a computer implemented method for providing a representative frame (Rframe) for a group of frames in a video sequence, the group of frames consituting a shot, being frames between consecutive scene changes, comprises (a) selecting a reference frame from the shot; (b) storing the reference frame in a computer memory; (c) defining a peripheral motion tracking region along an edge of the reference frame, the tracking region being narrow relative to dimensions of the frame; (d) sub-sampling the shot to select a number of frames therefrom; (e) stacking a smaller number of slices, one from each side of each selected frame are stacked and applying an edge detection algorithm to each of the smaller number of slices, whereby border pixels from one frame to the next are tracked, enabling a user to visualize motion associated with the shot.

In accordance with still another aspect of the invention, a computer implemented method for providing a representative frame (Rframe) for a group of frames in a video sequence, comprises (a) selecting a reference frame from the group of frames; (b) storing the reference frame in a computer memory; (c) defining a peripheral motion tracking region along an edge of the reference frame; and (d) successively tracking movement of boundary pixels in the tracking region for providing an indication of the length of a shot and the presence of a caption.

In accordance with still yet another aspect of the invention, a computer implemented method for providing a representative frame (Rframe) for a group of frames in a video sequence, the group of frames consituting a shot, being frames between consecutive scene changes, comprises (a) selecting a reference frame from the shot; (b) storing the reference frame in a computer memory; (c) defining four peripheral motion tracking regions along each edge of the reference frame, the tracking region being narrow relative to dimensions of the frame; and (d) successively tracking movement of boundary pixels in the tracking region such that a tracked position for each boundary pixel following a previous pixel occupies a position juxtaposed to a tracked position for the previous pixel for providing any of time indicators and caption indicators.

In accordance with further aspect of the invention, a computer implemented method for providing a representative frame (Rframe) for a group of frames in a video sequence comprises selecting a reference frame from the group of frames; storing the reference frame in a computer memory, defining a peripheral motion tracking region along an edge of the reference frame, and successively tracking movement of boundary pixels in the tracking region, symbolizing any of the length of the shot and the presence of any caption. The invention will be explained by way of exemplary embodiments and by reference to the drawing, helpful to an understanding of the invention, in which Figure 1 shows a representative frame, Rframe, for each video shot wherein are indicated (a) the structure of the Rframe, (b) motion tracking region; t=0 starts from the center of Rframe, (c)-(f) several examples;

Figure 2 shows the browser in the basic mode of operation;

Figure 3 shows the browser in the advanced mode of operation;

Figure 4 shows the browser in the advanced mode of operation with prefs.;

Figure 5 shows the frequency distribution (a) and block features (b) of DCT coefficients within a block; and Figure 6 shows an example of selecting subregions containing edges using the DCT coefficients. (a) The original frame. (b) The sub-regions found to contain no edges are shown in solid; the remaining regions may be decompressed for edge detection.

Figure 7 shows an overview of the DCT and block concepts.

The present invention embodies a novel approach to processing encoded video sequences prior to complete decoding. Scene changes are readily detected using DCT coefficients in JPEG and MPEG encoded video sequences. Within each 8x8 DCT block, the distribution of the DCT coefficients is used to classify the block as either type 0 (contains no high frequency components) or type 1 (contains high frequency components) The changes in the distributions of 0's and 1's from one frame to next is captured using eigenvectors and used to represent scene changes. The frames in between two consecutive scene changes form a video shot. Video shots may be thought of as the building blocks of video sequences, and are used in browsing, as herein disclosed in greater detail, database indexing, or any other operations that essentially form an abstraction of the video. To visualize each video shot, the content must be abstracted in a meaningful manner such that it is representative of the contents of the shot; this is achieved using representative frames or Rframes, as herein disclosed in greater detail.

The invention relates to the problem of detecting scene changes on encoded video sequences, particularly in the context of rapidly viewing the contents of a given video sequence, a process herein referred to as browsing. Browsing through video sequences is a critical requirement in many domains and applications in which the user is either required to choose a few video sequences from among many, and/or the user has to find a particular point within a single video sequence.

Such cases arise in numerous situations, such as in remote access of video, video database navigation, video editing, video-based education and training, and, in the near future, video e-mail and recorded desk-top video conferencing sessions. In such cases, the user must view the contents of the video sequences in order to choose the most relevant or to locate a desired point. Assigned labels, keyword descriptions, and database indexing may be useful in reducing the number of possibilities somewhat; however, in many cases the user is still left to decide among at least a number of possibilities. Consider, for instance, the case in which the user has submitted a query to a remote database and the database search has resulted in the offer of several possibilities. At this point the user must decide if the context and contents of the returned videos match the requirements. This may only be achieved by viewing each of the returned videos. Viewing video would require that each video be retrieved from, typically, a hierarchical storage system, transmitted over the network in its entirety as the user plays the video or, at most, fast forwards and rewinds. This process is time consuming, inefficient, not cost effective, and wasteful of bandwidth.

Abstractions of each of the video sequences are pre-computed and the abstractions are retrieved from the system, transmitted, as may be needed, and viewed by a user. The abstractions are many orders of magnitude smaller in size than the video sequences themselves, and thus, the system's response time, bandwidth needs, and, most importantly, the user's viewing time are reduced. In addition, the proposed system allows the user to rapidly pinpoint a desired location within a video sequence.

In accordance with an aspect of the invention, content-based video browsing is achieved by pre-processing steps which are performed off-line before the user gains access:

(a) detect scene changes in the compressed video to form video shots; and (b) construct the abstractions for each video shot to represent the contents.

The abstractions are referred to as Rframes. Additionally, a number of steps are performed during browsing which are driven by the users' particular needs:

(c) present the Rframes so that the user can easily search the contents of the video sequence; and (d) apply a technique to manage the Rframes comprising combining similarity measurements based on shape and color.

Processing during the browsing is necessary because each user may be different and may have varying needs at different times even for the same sequence.

The methodology herein disclosed represents the contents of a video sequence. The representation is used to allow the user to rapidly view a video sequence in order to find a particular point within the sequence and/or to decide whether the contents of the sequence are relevant to his or her needs. This system, referred to as content-based browsing, forms an abstraction, as herein disclosed in greater detail, to represent each detected shot, of the sequence by using a representative frame, or an Rframe, as herein disclosed, and it includes management techniques to allow the user to easily navigate the Rframes. This methodology is superior to the current techniques of fast forward and rewind because rather than using every frame to view and judge the contents, only a few abstractions are used. Therefore, the need to retrieve the video from a storage system and to transmit every frame over the network in its entirety no longer exists, saving time, expenses, and bandwidth.

Content-based browsing is advantageous over the fast forward and rewind technique (FF/REW) while nevertheless being as convenient to use. Using FF/REW the user must view every frame at rapid speeds, with the likelihood of missing shots that last a short period, while being forced to watch long lasting and possibly irrelevant shots. In addition, users searching for a specific point within a sequence are typically forced to refine their search after a number of fast forward and rewind operations until the video is at the precise point of interest, a time-consuming and tedious task. In the content-based browser in accordance with the invention, the exact points of scene changes are defined internally, and no "fine tuning" by the user is necessary. It is noteworthy that the above described disadvantages of FF/REW persist even on digital video and on other random access media, such as laser disks. Lastly, FF/REW as the means for browsing of digital video is extremely inefficient considering, the expense of accessing disks and/or tapes, decoding, and transmission.

The present invention also relates to processing compressed video efficiently for scene change detection. In accordance with an aspect of the invention, selective decoding is utilized to take advantage of the information already encoded in the compressed data; specifically a discrete cosine transform (DCT)-based standard such as JPEG (see G. K. Wallace, "The JPEG still picture compression standard", Communications of ACM, 34(4):30-44, April 1991) or H.261 (M. Liou. Overview of the 64 kbits/s video coding standard, Communications of ACM, 34(4):59-63, April 1991.) and many processing steps needed on every frame of a video sequence are performed prior to full decompression. The DCT coefficients are analyzed to systematically detect scene changes or video cuts which are used in browsing or in further feature extraction and indexing. In the past, expensive operations such as color histogram analysis, have been performed on every frame to achieve the same tasks. D. Le Gall. MPEG: A video compression standard for multimedia applications. Communications of ACM, 34(4):46-58, April 1991.

The encoding standards process begins with dividing each color component of the image into a set of 8x8 blocks. Figure 7 shows an overview of the DCT and block concepts. The pixels in the blocks are then each transformed using the forward discrete cosine transform (DCT):

$$F(u, v) = \frac{1}{4} C(u) C(v) \left[ \sum_{x=0}^{7} \sum_{y=0}^{7} f(x, y) \cdot \cos \frac{(2x+1) u\pi}{16} \cos \frac{(2y+1) v\pi}{16} \right]$$

where $C(\tau) = 1/(\sqrt{2})$ if $\tau = 0$ and $1$ otherwise, F(u,v) are the DCT coefficients, and f(x,y) are the input pixels. F(0,0) is the DC term - the average of the 64 pixel values, and the remaining 63 coefficients are termed the AC coefficients. The 64 coefficients from each block are then quantized to preserve only the visually significant information:

$$\tilde{F}(u, v) = \left[ \frac{F(u, v)}{Q(u, v)} \right]$$

where Q(u,v) are the elements of the quantization table, and [ ] represents the integer rounding operation. The coefficients are then encoded in a zig-zag order by placing the low order frequency components before the high frequency components. The coefficients are then encoded using the Huffman entropy encoding. The processing presented next assumes that the encoded data has partially been decoded by applying the Huffman decoder and the resultant coefficients may or may not have been dequantized depending on the quantization table. See Figure 5 for the frequency distribution (a) and block features (b) of DCT coefficients within a block. Zero coefficients in the "high" regions indicate that the 8x8 block has low frequency components only and substantially no high frequency components. See Figure 6 for an example of selecting subregions containing edges using the DCT coefficients. (a) The original frame. (b) The sub-regions found to contain no edges are shown in solid; the remaining regions may be decompressed for edge detection.

The approach taken in accordance with the present invention differs from previous solutions in that, inter alia, unlike prior methods wherein all steps are performed on decompressed video frames, the present invention takes advantage of the fact that the incoming video is already in the compressed form. Thereafter, the information that is already encoded in the compression process is utilized to take advantage of several facts: first, the computational cost of fully decompressing every frame is not necessary and is saved when only a selected number of frames are chosen prior to decompression for further processing or for browsing. Second, coefficients in the spatial frequency domain are mathematically related to the spatial domain, and they may directly be used in detecting changes in the video sequence. Third, the knowledge of the blocks' location preserves spatial domain information to a certain extent.

The scene change detection is performed by the application of a programmed computer in accordance with the following method or "algorithm":

(a) examine each DCT block in the compressed video frame, and if high frequency coefficients exist mark that block as 1, else mark that block as 0. The output of this step is a matrix of 0s and 1s. The size of this matrix is determined by the size of the video frame divided by 8 length wise and width wise. For example, a 320 x 240 video frame will yield a 40 x 30 matrix;

(b) delete columns or rows to transform the matrix of step 1 into a square matrix; for example delete 10 columns to obtain a 30 x 30 matrix. Preferably, for every frame of the video, the same corresponding columns or rows are deleted. This step may include subsampling to reduce the matrix size. For example, delete every other row and column. The final output from this step is an n x n matrix;

(c) derive the two principal vectors of the matrix, to describe the contents of each video frame, in accordance with principles of linear algebra that state that each n x n matrix has at least one and at most n eigenvalues:

$\lambda_i, 1 \geq i \geq n.$ and for two dimensional shapes there will be 2 eigenvalues, that each eigenvalue will have a corresponding eigenvector, and that these two vectors are the principal vectors of the matrix;

(d) detect a change in the content from one video frame to the next, or scene changes, by utilizing the inner product to detect such change, since a change in the content from one video frame to the next, or scene changes, will also cause the vectors to change in accordance with the following expression:

$$\partial (f, f+\Delta) = \frac{\overrightarrow{x_i(f)} \cdot \overrightarrow{x_i(f+\Delta)}}{\left|\overrightarrow{x_i(f)}\right|\left|\overrightarrow{x_i(f+\Delta)}\right|}, \text{ (where } i \in \{1,2\}) \quad (1)$$

where $\Delta$ is the temporal distance in between two frames; and (e) if, $\partial, 1 \geq \partial \geq 0,$ is larger than a threshold, $\tau$, then indicate that a scene change has occurred.

The video content in between two scene changes is labeled as a "shot".

If the format of the video is motion JPEG, then the DCT coefficients of step (a) are obtained from each frame and Equation (1) is applied as stated in step (e). In case the format is MPEG where three types of frames are defined (I, B, and P), each two frames in Equation (1) must be of the same type; i.e, Equation (1) cannot compare an I frame with the neighboring B or P frame.

Each detected shot is represented using an Rframe, which is designed to allow the user to perform five tasks: first, to be able to judge the contents of the shot. Second, to decide if the scene change detection may have missed a shot. While many of the proposed scene change detectors have high accuracy rates of 90% and above, none claims 100% accuracy; in addition, many complicated transitions can cause false negatives during scene change detection. Therefore, from the user's point of view, it is desirable that there be a mechanism to ensure the user that no scene changes have been missed during this shot. The third task of the Rframe is to provide the user with the sense of motion within the shot. The fourth feature allows the user to easily determine the length or duration of the shot in seconds. The fifth allows the user to determine if any captions appear in the video shot. In order to form the Rframes the video sequence must have already been divided into meaningful segments, such as video shot (the frames in between two consecutive scene changes form a video shot, as herein disclosed. The collection of Rframes is used to represent the contents of the entire video sequence in browsing and in navigation operations, as herein explained in relation to browsing the contents of a given video sequence.

Each Rframe comprises a body, four motion tracking regions, shot length indicators and a caption indicator. See Figure 1. The body of the Rframe is a frame chosen from the video shot; currently, the tenth frame is chosen, but other possibilities exist, such as the last frame for zoom-in shots. The motion tracking regions trace the motion of boundary pixels through time; hence they can be used as guides to camera, or global, motion. The motion tracking regions also serve as an indicator of missed scene changes. In case the shot contains a scene change, the tracking of boundary pixels will "fail" causing a straight line to appear in the motion tracking region (see Figure 1-e). The time indicators are designed so that a brief glance at each Rframe allows the user to determine if the corresponding shot is long or short while a more precise estimation of the length of the shot is also possible well by counting the 2 and 4 second squares. This representation of shot length does not occupy any valuable screen space; printing the exact number of seconds on the other hand would not allow the user to quickly compare shot lengths.

In Figure 1, a representative frame, Rframe, for each video shot is shown. (a) shows the structure of the Rframe, (b) shows motion tracking region; t=0 starts from the center of Rframe, (c)-(f) show several examples: (c) the anchorman has moved his hands but the camera is stationary as is evidenced by the straight lines, and the shot contains a caption; (d) shows that the camera has panned to the left following the motion of the animal, the curves start (t=0) and move to the right, no captions are present in this shot; (e) shows an example of a missed scene change, the straight lines not in contact with the center indicate the possibility that the shot may contain a scene change; (f) shows that the camera is stationary but the objects have moved in various directions; this shot contains a caption.

To construct the motion tracking regions, the shot is sub-sampled to select a few of the frames. Four slices, one from each side, of each selected frame are then stacked and an edge detection algorithm is applied to each of the four stacks. This simple operation in effect tracks the border pixels from one frame to the next enabling the user to visualize the motion.

Edge detection is a local operation performed using the principles of convolution. A mask which is an m x m matrix is convolved with the pixels ineach of the motion tracking regions. The output of the convolution highlights the pixels where there are changes in two neighboring pixels, where neighboring means left, right, top, or

94 P 7440 bottom. Many m x m matrices exist, such as the Laplacian matrix:

```
0   0   0
1  -4   1
0   1   0
```

Reference is made to Gonzalez, op. cit. for more details.

As mentioned earlier, video sequences require a "basic browsing unit" which can be used in browsing, and unlike the case of newspapers or books where an editor manually chooses the headline for each article or chapter, the process of choosing the video browsing unit must be automatic. This is because of the vast amount of data that will exist in the video sequences. Furthermore, manual intervention would inherently incorporate extrinsic influences into the material. This influence could in turn impede a user's search by providing false leads or not enough leads and thereby requiring the user to use FF/REW. While the process of choosing the video browsing unit must be automatic, its result must also be meaningful to the user because this is the tool used to decide whether the returned video sequences are relevant to the task at hand. A remaining issue in designing a videobrowser is its speed; the video browser must be significantly faster, as compared with FF/REW, while remaining convenient to use.

A video browser disclosed herein satisfies the above requirements. The proposed video browser uses shots as the basic building blocks of a video sequence characterized by the use of "representative frames", or Rframes. The sequences in the video collection are pre-processed once to detect the scene changes and to build the Rframes. Then, to browse a particular videosequence, the user may scroll through all the Rframes to view the visual contents of the sequence. Once the user has chosen an Rframe, the corresponding video shot may be played back. Further information, such as the length of each shot and the approximate motions, are readily represented as well. In cases in which several hundred scenes, and therefore several hundred Rframes, may exist in a given video sequence, advanced techniques are used to allow the user to easily manage the information.

At start up, the browser displays the precomputed Rframes in chronological order, (see Figure 2, which shows the browser in the basic mode of operation. The row of Rframes is on the bottom, and the sequence at the point chosen by the user is displayed on top. The user may play the video from that pointand automatically stop at the end of the shot, or continue past the scene change.). The user may scroll through the Rframes and once an Rframe is chosen, then the video is played from precisely that point. The user's second option is to choose one Rframe and view all other similar Rframes. The degree to which each Rframe in the sequence is similar to the chosen Rframe is conveyed to the user by varying the size of each Rframe. The most similar Rframes are displayed at their original scale, somewhat similar Rframes are displayed at a smaller scale, for example, at a default value of 33% scale, and the dissimilar Rframes are displayed at even a smaller scale (default 5%), see Figure 3, which shows the browser in the advanced mode of operation. The top row is the original set of Rframes, the user has the chosen one Rframe (outlined by the red square) and the bottom row show all other similar Rframes, somewhat similar Rframes are shown at 33% of the originalwidth, and non-similar Rframes are shown at 5% of the original width -scene as black bars. The defaults are easily adjustable by the user (see Figure 4, which shows the browser in the advanced mode of operation with prefs. The browser in the advanced mode of operation as the user is choosing how to view each grouping category in the preferences window. The shown setting indicates that the somewhat and not similar Rframes be shown as black bars, and only the similar Rframes are shown at full scale.).

In addition to asking similar Rframes to be displayed on the second row of the browser, the user can combine several requests: show Rframes that are "similar" to Rframe X and "not similar" to Rframe Y. After each request the results are shown on a new reel of Rframes. Therefore, the user may have several reels at any time each containing a different "view" of the same sequence. The user's requests may be performed on any one of reels and the results displayed in a new reel or by overwriting an existing one depending on user's preferences.

As mentioned earlier, the browser must be as convenient to use as the current method of FF/REW. The proposed browser satisfies this criterion; the only user required actions are scroll and single or double clicks on a control mouse.

Assuming the scene changes have been detected, several issues arise when there are numerous Rframes — for example, more than the user can easily search and navigate through. As mentioned earlier, the user may choose one Rframe and ask the system to return all similar Rframes in the same videosequence. The key to measure this similarity effectively and correctly is the means by which each Rframe is represented internally. Representations are used to describe Rframes, a key issue in the field of computer vision. The representations dictate the matching strategy, its robustness, and the system's efficiency. Also, the descriptions are used in the calculations of various properties of objects in the scene needed during the grouping stage. In almost all cases, the two-dimensional array of numbers used to display the Rframes is not very useful in its "raw" form.

94 P 7440

The browser uses two representation schemes which complement one another: Shape properties represented using moments, and color properties represented using color histograms. Both representation schemes are insensitive to minor changes in the scene, such as object motion, viewing distance, and so forth, and both are compact representations allowing for efficient similarity measurements. The following two sections describe these representation schemes and their usage in more detail.

The shape of objects within an Rframe is the main property used in Rframe management, and it is represented using moment invariants. The moment of an image f(x,y) is defined as:

$$m_{pq} = \sum\sum x^p y^q f(x,y) \qquad (2)$$

A physical interpretation of moments is possible if the grey level of each Rframe is regarded as its mass; then, in such an analogy, $m_{00}$ would be the total mass of an Rframe and $m_{20}$ and $m_{02}$ would be the moments of inertia around the x and y axes. Moments invariants exhibit characteristics which makes them an ideal representation mechanism in the video browser. Invariance with respect to any of scale change, rotation, and translation, are some of such characteristics which are used in the browser to describe Rframes. Moment invariants are derived from normalized central moments defined as:

$$\eta_{pq} = \frac{1}{m_{00}^\gamma} \sum\sum (x-\bar{x})^p (y-\bar{y})^q f(x,y) \qquad (3)$$

where $\gamma = \left(\frac{p+q}{2}+1\right)$, $\bar{x} = m_{10}/m_{00}$ and $\bar{y} = m_{01}/m_{00}$. Then, the first few moment invariants are defined as (M.-K. Hu, Pattern Recognition by moment invariants, in Proc. IRE, Vol. 49, 1961, p. 1428. M.-K. Hu, Visual pattern recognition by moment invariants, in IRE Trans. Inform. Theory, Vol. 8, February 1962, pp. 179-187. R. Gonzalez and P. Witz, Digital Image Processing, Addison-Wesley, Readings, MA, 1977.):

$$\varphi_1 = \eta_{20} + \eta_{02}$$

$$\varphi_2 = (\eta_{20} - \eta_{02})^2 + 4\eta_{11}^2 \qquad (4)$$

$$\varphi_3 = (\eta_{30} - 3\eta_{12})^2 + (3\eta_{21} - \eta_{03})^2$$

The shape of each Rframe is then represented using the vector defined as:

$$\vec{\sigma} = \{\varphi_1, \varphi_2, \varphi_3, ..., \varphi_7\} \qquad (5)$$

Finally, the Euclidean distance is used to measure the similarity of two Rframes:

$$\psi(\alpha, \beta) = |\vec{\sigma_\alpha} - \vec{\sigma_\beta}|^2 \qquad (6)$$

Color is the second feature used extensively in Rframe management in accordance with the present invention. Color has many of the characteristics of moments, such as the ability to simply represent, or describe each Rframe. Contrary to the case of moments, however, it is less sensitive to differences, such as due to motion within a frame. Color cannot be the sole representation of Rframe contents because most means of representing color rely on color histograms which by definition are plurality-to-one mapping functions. Hence, many completely different Rframes, or video frames, may have very similar color representations. Color histograms alone are not sufficient to detect any differences in a red and white checkered board versus a white board with red parallel lines, for example, since the color contents of the two can be identical.

The browser represents the color contents of each Rframe using the color histogram, which is essentially the frequency distribution function of the color of each pixel. Given a color model(RGB, HSI, etc.), the histogram is obtained by counting how many times each color appears in each Rframe (see   C.L. Novak and S.A. Shafer, Anatomy of a Color Histogram, in Proceeding of Computer Vision and Pattern Recognition, Champaign, IL, June, 1992, pp. 599-605 for more details). It is herein recognized to use the hue and saturation components of the HSI color space, in accordance with the inventors' previous work (F. Arman, A. Hsu and M-Y. Chiu, Image Processing on Encoded Video Sequences, in ACM Multimedia Systems Journal, to appear 1994) to calculate the color histogram for each Rframe. In order to measure the similarity of two given Rframes, the technique of histogram intersection known from Swain and Ballard (Swain, M.J. and Ballard, D.H., Color Indexing, in Int. J. of Computer Vision, Vol. 7, No. 1, 1991, pp. 11-32) is herein applied. The intersection of two histograms is defined as:

$$\sum_{j=1}^{n} min(\alpha(j), \beta(j)) \qquad (7)$$

where $\alpha$ and $\beta$ are the two histograms. The result of this intersection indicates how many pixels in one image have corresponding pixels of the same color in the other image, and the measure is normalized using:

$$\varepsilon(\alpha, \beta_i) = \left( \sum_{j=1}^{n} min(\alpha(j), \beta_i(j)) \right) / \left( \sum_{j=1}^{n} \beta_i(j) \right) \qquad (8)$$

where $\beta_i$ is the ith histogram.

Once the user has chosen an Rframe, the moments and the color histogram of that Rframe are compared to the remaining Rframes. The output of the moment-based and color histogram-based analyses are two floating point numbers describing the similarity in shape and in color of the Rframes' body. In order to combine and compare these two different entities a mapping function is used which maps both entities onto a common space. This is performed using:

$$\Omega(\ ) = \begin{cases} 3 & \text{if } \zeta < \tau_1 \\ 2 & \text{if } \tau_1 \leq \zeta \leq \tau_2 \\ 1 & \text{if } \zeta > \tau_2 \end{cases} \quad (9)$$

where $\zeta = \epsilon(\alpha, \beta_i)$ for mapping of color histogram intersection output of Equation (7):

$$\Omega_{histogram}[\epsilon(\alpha,\beta_i)] \in \{1,2,3\} \quad (10)$$

and $\zeta = (\alpha,\beta_i)$ for mapping moment distance measure of Equation (5):

$$\Omega_{moment}[(\alpha,\beta_i)] \in \{1,2,3\} \quad (11)$$

$\Omega=3$ signifies very similar, $\Omega=2$ somewhat similar, and $\Omega=1$ not similar.

The rules of Table 1 are then used to combine the mapped properties. Generally, the output of

| moment | color | final |
|--------|-------|-------|
| 3 | 3 | 3 |
| 3 | 2 | 3 |
| 3 | 1 | 2 |

| 2 | 3 | 3 |
|---|---|---|
| 2 | 2 | 2 |
| 2 | 1 | 1 |
| 1 | 3 | 1 |
| 1 | 2 | 1 |
| 1 | 1 | 1 |

TABLE 1: The rules for combining the results of the moment-based and histogram-based matching: 3=very similar, 2=somewhat similar, and 1=not similar.

moments carries a bigger weight (see Table 1). If Wmoment=1 then the output of the color-histogram-based analysis is ignored; i.e., the final output will always be that the two Rframes under examination are not similar. If Wmoment=3 then the final output is also very similar, the only exception being when color-based output Whistogram=1 in which case the final output will also be 2, or somewhat similar. The mapping from color histogram is used when Wmoment is not conclusive; i.e., Wmoment=2; in this case the final output is set to the value of the color histogram mapping.

The processing time for the grouping takes advantage of two points. First, the moments and the histograms are calculated a priori and the only step needed at run time is measuring similarity; i.e., applying Equation (2) and Equation (8). Second, using the rules specified in Table 1, the histogram intersection operation, the more expensive of the two operations, has to be performed on a subset of the Rframes providing additional time saving steps. It is also contemplated within the context of the present invention to utilize an indexing scheme to store the histogram and the moment calculations; this greatly speeds up the grouping time.

Reference is made to the following patent applications being filed concurrently herewith and being subject to an obligation of assignment to the same assignee as is the present application, and whereof the disclosures are herein incorporated by reference: DETECTING SCENE CHANGES ON ENCODED VIDEO SEQUENCES in the names of Farshid Arman, Arding Hsu, and Ming-Yee Chiu; and BROWSING CONTENTS OF A GIVEN VIDEO SEQUENCE in the names of Farshid Arman, Remi Depommier, Arding Hsu, and Ming-Yee Chiu.

Reference is also made to Tonomura, Y. and Abe, S., Content Oriented Visual Interface Using Video Icons for Visual Database Systems, in Journal of Visual Languages and Computing, Vol. 1, 1990, pp. 183-198.

It should be clearly understood that the foregoing embodiments are practiced by the use of a programmed digital computer. The invention has been explained by way of exemplary embodiments. However, it will be understood that various changes and modifications will be apparent to one of skill in the art to which the present invention pertains, but such changes and modifications are understood to be within the spirit of the invention whose scope is defined by the claims following.

What is claimed is:

1. A method for detecting a cut in a video, comprising the steps of:
   (a) acquiring video images from a source;
   (b) deriving from said video images a pixel-based difference metric;
   (c) deriving from said video images a distribution-based difference metric;
   (d) measuring video content of said video images to provide up-to-date test criteria by collecting statistics from each DC image and each pair of DC images to represent current video content, being an image contrast and a motion estimate;
   (e) combining said pixel-based difference metric and said distribution-based difference metric, taking into account said up-to-date test criteria provided in step (d) to derive a scene change candidate signal; and
   (f) filtering said scene change candidate signal to generate a scene change frame list.

2. A method for detecting a cut in a video in accordance with claim 1, wherein said pixel-based difference metric for each frame is the summation of an absolute frame difference representative of image intensity value at selected pixel locations in a frame.

3. A method for detecting a cut in a video in accordance with claim 1, wherein said pixel-based difference represented by a metric for each frame t is the sum of an absolute frame difference, $$\sum_{ij} |f_{ij}^t - f_{ij}^{t-1}|$$

where $f^t_{ij}$ represents the intensity value at pixel location (i,j) in frame t.

4. A method for detecting a cut in a video in accordance with claim 1, wherein each image is divided into a number of sub-regions and wherein said distribution-based difference metric is a Kolmogorov-Smirnov test metric, said test is carried out for the entire image as well as its sub-regions.

5. A method for detecting a cut in a video in accordance with claim 1, wherein each image is equally divided into four sub-regions and wherein said distribution-based difference metric is a Kolmogorov-Smirnov test metric, except that one each is computed herein for the entire image as well as said four equally divided sub-regions.

6. A method for detecting a cut in a video in accordance with claim 1, wherein said step of measuring video content of said video images to provide said up-to-date test criteria provides said step (e) with the ability to automatically adjust to different video contents.

7. A method for detecting a cut in a video in accordance with claim 1, wherein said video images are DC images represented by the base frequency in the Discrete Cosine Transform coefficients representing the underlying image frame.

8. A method for detecting a cut in a video in accordance with claim 1, wherein said image contrast estimate is computed based on a recursive scheme to suppress influences of sudden lighting changes.

9. A method for detecting a cut in a video in accordance with claim 8, wherein said image contrast estimate is computed based on a recursive scheme to suppress the influences of sudden lighting changes.

10. A method for detecting a cut in a video in accordance with claim 8, wherein said image contrast estimate equals 0.6.

11. A method for detecting a cut in a video in accordance with claim 8, wherein said motion estimate is computed as follows:

$$motion_t = (1-\tau)motion_{t-1} + \tau \sum_{ij} \left( \frac{|f_{ij}^{t-1} - f_{ij}^{t-2}|}{N} \right)$$

where $f^{t-1}_{ij}$ is the intensity value at pixel location (i, j) of the DC image at time t−1, N is the size of the image.

12. A method for detecting a cut in a video in accordance with claim 8, wherein said image contrast and said motion estimates are applied to a fuzzy engine to compute a new significance level for the hierarchical Kolmogorov-Smirnov test, said fuzzy engine using a quadratic membership function, where each contrast measurement is divided into classes, from low to high, and each motion estimate is divided into classes, from slow to fast, and each significance level is divided into classes from high to low.

13. A method for detecting a cut in a video in accordance with claim 12, wherein each contrast measurement is divided into four classes, low, middle, high, and extremely high, each motion estimate into three classes, slow, middle, and fast, and each significance level into five classes, high, middle high, middle, middle low, and low, and wherein the fuzzy rules are stated in a simple IF/THEN format, where values are combined using AND (minimum) or OR (maximum) operations.

14. A method for detecting a cut in a video in accordance with claim 13, including *a step of defuzzifying said fuzzy rules to yield a crisp final output value, by finding the center of gravity of the combined output shape, whereby all rules are ensured of contributing to the final crisp result.

15. A method for detecting a cut in a video in accordance with claim 1, wherein said collecting statistics from each DC image and each pair of DC images to represent current video content represent an image contrast estimate and a motion estimate.

16. A method for detecting a cut in a video in accordance with claim 1, wherein said image contrast estimate is derived in accordance with the following:

$$contrast_t = (1-\tau)contrast_{t-1} + \tau\sigma_{t-1}$$

where $\sigma_{t-1}$ is the intensity variance estimate of the DC image at time t−1.

17. A method for detecting a cut in a video in accordance with claim 16, wherein τ equals 0.6.

18. A method for detecting a cut in a video in accordance with claim 1, wherein in said step (e) of combining said pixel-based difference metric and said distribution-based difference metric, taking into account said up-to-date test criteria provided in step (d) so as to derive a scene change candidate signal, said pixel-based difference metrics are treated as time series signals, where both visually abrupt cuts and duplication of frames create observation outliers.

19. A method for detecting a cut in a video in accordance with claim 18, wherein said pixel-based difference metric is treated as a time series signal, where both visually abrupt cuts and the duplication of frames create observation outliers obeying the equation $$d_t = f(d_{t-r}, d_{t-r+1}, \ldots, d_t) + u_t \text{ if } t \neq q$$

$$d_t = f(d_{t-r}, d_{t-r+1}, \ldots, d_t) + u_t + \Delta \text{ otherwise}$$

where t represents the time index, Δ is the outlier, $f(d_{t-r}, d_{t-r+1}, \ldots, d_t)$ models the trend in the series, and $$u_t = \sum_{r=1}^{p} \alpha_r d_{t-r} + z_t \quad (t = p+1, \ldots, n).$$

20. Apparatus for detecting a cut in a video, comprising:
(a) means for acquiring video images from a source;
(b) means for deriving from said video images a pixel-based difference metric;
(c) means for deriving from said video images a distribution-based difference metric;
(d) means for measuring video content of said video images to provide up-to-date test criteria;
(e) means for combining said pixel-based difference metric and said distribution-based difference metric, taking into account said up-to-date test criteria provided in step (d) so as to derive a scene change candidate signal;
(f) means for filtering said scene change candidate signal so as to generate a scene change frame list; and
(g) means for presenting two cross-section images of said video images, wherein one is a horizontal cross section image in a horizontal direction and the other is a vertical cross section image in a vertical direction of the video volume.

21. Apparatus for detecting a cut in a video in accordance with claim 20, wherein each cross-section image is constructed by sampling one row (or column) from every image, and reducing the amount of information from a two-dimensional image to two one-dimensional image strips.

22. Apparatus for detecting a cut in a video in accordance with claim 21, wherein said horizontal and vertical cross-section images are combined into one image segmented into two bands according to a list of detected shots, wherein a level of abstraction is presented that is enough to reveal whether there is a missed or misdetected shot.

23. Apparatus for detecting a cut in a video in accordance with claim 20, including means for presenting at least two cross-section images of said video images, whereof one is a horizontal cross section image in a horizontal direction and the other is a vertical cross section image in a vertical direction of the video volume.

24. Apparatus for detecting a cut in a video in accordance with claim 23, wherein each cross-section image is constructed by sampling one row (or column) from every image, and reducing the amount of information from a two-dimensional image to a plurality of one-dimensional image strips.

25. Apparatus for detecting a cut in a video in accordance with claim 24, wherein said at least two cross-section images, including said horizontal and vertical cross-section images, are combined into one image segmented into a plurality of bands according to a list of detected shots, whereby a level of abstraction is presented that is enough to reveal whether there is a missed or misdetected shot.

\* \* \* \* \*